(12) United States Patent
Kim et al.

(10) Patent No.: US 12,218,723 B2
(45) Date of Patent: Feb. 4, 2025

(54) COMMUNICATION DEVICE PERFORMING BEAM-FORMING AND OPERATING METHOD THEREOF

(71) Applicant: SAMSUNG ELECTRONICS CO., LTD., Suwon-si (KR)

(72) Inventors: Leechun Kim, Hwaseong-si (KR); Kwonyeol Park, Jeonju-si (KR); Minwoo Park, Seoul (KR); Sanghyun Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/858,372

(22) Filed: Jul. 6, 2022

(65) Prior Publication Data
US 2023/0027814 A1 Jan. 26, 2023

(30) Foreign Application Priority Data
Jul. 7, 2021 (KR) .................. 10-2021-0089385

(51) Int. Cl.
*H04B 7/06* (2006.01)
*H04W 16/28* (2009.01)

(52) U.S. Cl.
CPC .......... *H04B 7/0617* (2013.01); *H04W 16/28* (2013.01)

(58) Field of Classification Search
CPC ...... H04B 7/0408; H04B 7/0452; H04B 7/06; H04B 7/0617; H04W 16/28
See application file for complete search history.

(56) References Cited

U.S. PATENT DOCUMENTS

| | | | |
|---|---|---|---|
| 7,236,808 B2 | 6/2007 | Goldberg | |
| 8,885,752 B2 | 11/2014 | Shirani-Mehr et al. | |
| 9,768,849 B2 | 9/2017 | Ko et al. | |
| 10,082,581 B2 | 9/2018 | Wyler et al. | |
| 10,263,679 B2 | 4/2019 | Kim et al. | |

(Continued)

FOREIGN PATENT DOCUMENTS

| | | |
|---|---|---|
| EP | 2555445 A1 | 2/2013 |
| KR | 100620414 | 9/2006 |
| KR | 100850888 | 8/2008 |

(Continued)

OTHER PUBLICATIONS

Minghuan Tang et al., "Throughput Optimization in MU-MIMO Systems via Coordinated Vertical Double-beam Tilting", 2014 IEEE International Conference.

(Continued)

*Primary Examiner* — David S Huang
(74) *Attorney, Agent, or Firm* — Fish & Richardson P.C.

(57) ABSTRACT

Disclosed are a communication device for performing beam-forming and an operating method thereof. The communication device includes: an antenna array configured to simultaneously form a first vertical beam and a second vertical beam for an arbitrary time; a transceiver configured to transmit and receive a signal using a double beam including the first vertical beam and the second vertical beam; and a processor configured to determine a first optimal vertical tilting angle of the first vertical beam based on Inter-Beam Interference (IBI) of the second vertical beam, and determine a second optimal vertical tilting angle of the second vertical beam based on the IBI of the first vertical beam.

16 Claims, 16 Drawing Sheets

(56) References Cited

U.S. PATENT DOCUMENTS

| | | | |
|---|---|---|---|
| 10,979,932 B2* | 4/2021 | Imran | H04W 76/15 |
| 2004/0063467 A1 | 4/2004 | Shapira et al. | |

FOREIGN PATENT DOCUMENTS

| | | |
|---|---|---|
| KR | 1020150059104 | 6/2016 |
| KR | 101696992 | 1/2017 |
| KR | 102079511 | 2/2020 |

OTHER PUBLICATIONS

Soheil Khavari Moghaddam et al., "Joint Tilt Angle Adaptation and Beamforming in Multicell Multiuser Cellular Networks".
Qurrat-Ul-Ain Nadeem et al., "Elevation Beamforming with Full Dimension MIMO Architectures in 5G Systems: A Tutorial".
European Patent Application Search Report dated Nov. 10, 2022 cited in corresponding EP Patent Application No. 22183038.3.
"5G/NR—Beam Management", https://www.sharetechnote.com/html/5G/5G_Phy_BeamManagement.html.
"3GPP TR 38.802 V14.2.0 (Sep. 2017)", 3rd Generation Partnership Project; Technical Specification Group Radio Access Network; Study on New Radio Access Technology Physical Layer Aspects (Release 14).

* cited by examiner

FIG. 5

| $N_1 - N_2 > 0$ | $\theta_1^* = \dfrac{\displaystyle\sum_{\{i\mid\theta_1-\theta_W<\Phi_{b,i}<\Phi_{B_1}\}} \Phi_{b,i} \;-\; \sum_{\{i\mid\theta_{B_1}<\Phi_{b,i}<\theta_2+\theta_W\}} \Phi_{b,i}}{N_1 - N_2}$ |
|---|---|
| $N_1 - N_2 < 0$ | $\theta_1^* = \theta_1 - \theta_W$ |
| $N_3 - N_4 < 0$ | $\theta_2^* = \theta_2 + \theta_W$ |
| $N_3 - N_4 > 0$ | $\theta_2^* = \dfrac{\displaystyle\sum_{\{i\mid\theta_{B_2}<\Phi_{b,i}<\theta_2+\theta_W\}} \Phi_{b,i} \;-\; \sum_{\{i\mid\theta_2-\theta_W<\Phi_{b,i}<\theta_{B_2}\}} \Phi_{b,i}}{N_4 - N_3}$ |

COMMUNICATION DEVICE PERFORMING BEAM-FORMING AND OPERATING METHOD THEREOF

CROSS-REFERENCE TO RELATED APPLICATION

This application is based on and claims priority under 35 U.S.C. § 119 to Korean Patent Application No. 10-2021-0089385, filed on Jul. 7, 2021, in the Korean Intellectual Property Office, the disclosure of which is incorporated by reference herein in its entirety.

BACKGROUND

The present disclosure relates to wireless communication, and more particularly, to a communication device for performing beamforming and an operating method thereof.

In order to meet the growing demand for wireless data traffic, a communication system implemented in a very high frequency band is being developed. In order to mitigate the path loss of radio waves in the very high frequency band and increase the propagation distance of radio waves, in a 5th generation (5G) communication system, technologies such as beamforming, massive MIMO, and Full Dimensional-Multi Input Multi Output (FD-MIMO) are being researched.

In the FD-MIMO system, a base station may achieve excellent spatial multiplexing at a high transmission rate by performing beamforming and power allocation. In particular, research is being conducted into a method of maximizing the throughput of a communication system received by each terminal by applying antenna tilting according to the location of the terminal, and in particular, an algorithm for determining the optimal tilting angle that maximizes the throughput of the system is also being developed.

In addition, a base station including a plurality of antennas may perform a beamforming operation to transmit a transmission signal to a plurality of terminals. Beamforming may refer to a method of transmitting signals having directionality to a plurality of antennas, and the base station may transmit a downlink signal to a terminal performing wireless communication in a beamforming method.

SUMMARY

The present disclosure provides a communication device capable of optimizing a system throughput by flexibly applying a plurality of vertical antenna tilts according to the location of users, and an operating method thereof.

In order to achieve the above object, a communication device includes: an antenna array configured to simultaneously form a first vertical beam and a second vertical beam for an arbitrary time, a transceiver configured to transmit and receive a signal using a double beam including the first vertical beam and the second vertical beam, and a processor configured to determine a first optimal vertical tilting angle of the first vertical beam based on Inter-Beam Interference (IBI) of the second vertical beam, and determine a second optimal vertical tilting angle of the second vertical beam based on the IBI of the first vertical beam.

According to an aspect of the inventive concept of the present disclosure, a method of operating a communication device that performs beamforming includes forming a first vertical beam and a second vertical beam simultaneously in a single cell for an arbitrary time, determining first and second optimal vertical tilting angles based on a signal-to-interference-plus-noise ratio (SINR) between a double beam including the first vertical beam and the second vertical beam, and transmitting a signal using the first vertical beam and the second vertical beam, wherein the SINR of the first vertical beam and the second vertical beam is calculated by considering the second vertical beam and the first vertical beam as an interference signal, respectively.

According to an aspect of the inventive concept of the present disclosure, a communication system that performs beamforming includes: a base station configured to determine first and second optimal vertical tilting angles, form a first beam and a second beam to which the first and second optimal vertical tilting angles are applied, respectively, and transmit a signal using the first beam and the second beam at the same time; and at least one user equipment configured to select a beam having a larger signal-to-interference-plus-noise ratio (SINR) value among the first beam and the second beam, receive the signal by accessing the selected beam, wherein the first and second optimal vertical tilting angles are obtained by a K-means Interference Avoidance (KIA) algorithm considering interference between the first beam and the second beam.

BRIEF DESCRIPTION OF THE DRAWINGS

Embodiments of the inventive concept will be more clearly understood from the following detailed description taken in conjunction with the accompanying drawings in which:

FIG. 5 shows a table summarizing the optimal vertical tilting angles $\theta_1^*$ and $\theta_2^*$ according to the number of user devices included in the cluster.

DETAILED DESCRIPTION OF THE EMBODIMENTS

Hereinafter, embodiments of the present disclosure will be described in detail with reference to the accompanying drawings.

Figure 1:
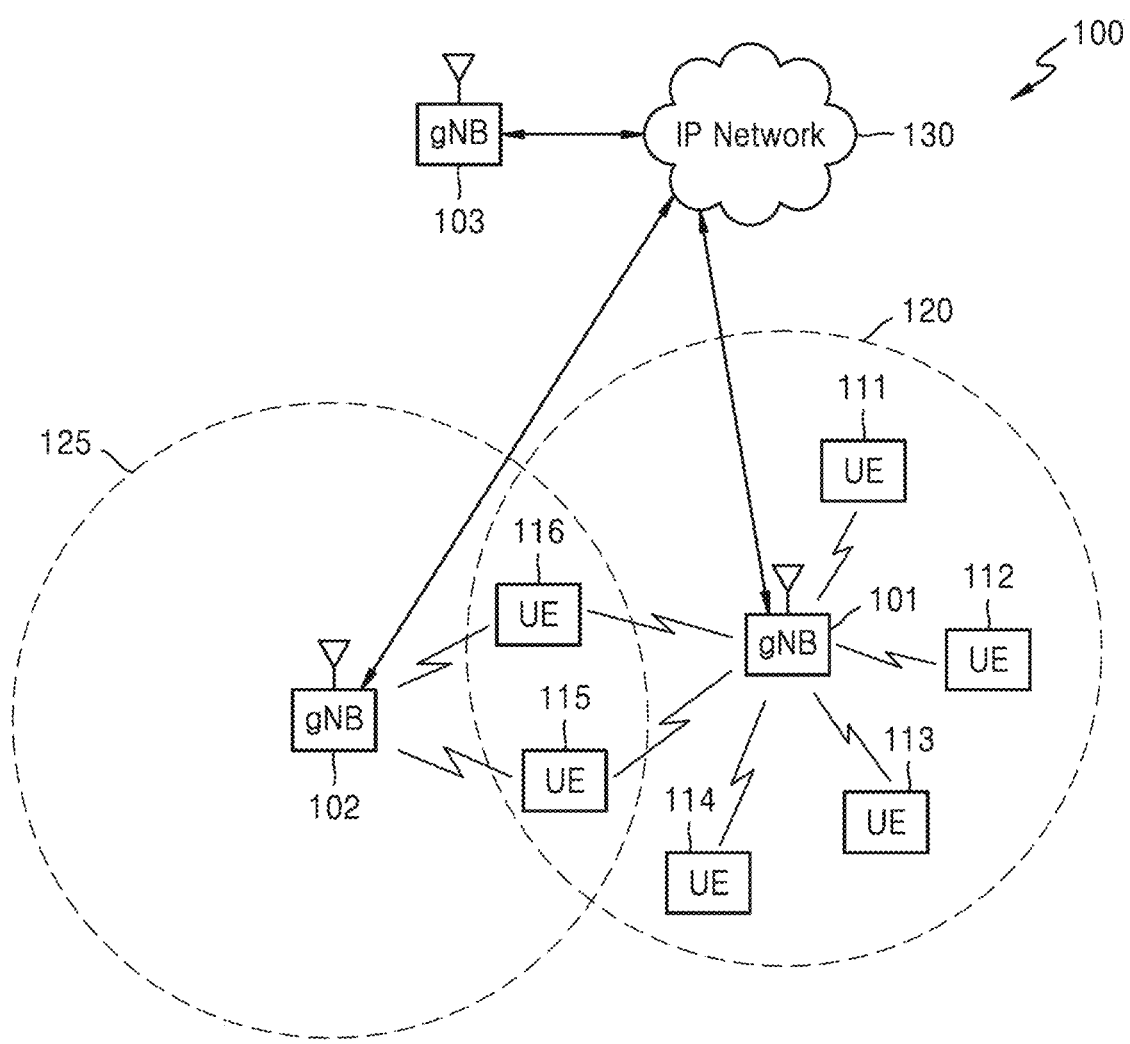
FIG. 1 is a diagram schematically illustrating a wireless communication system 100 according to an exemplary embodiment of the present disclosure.

FIG. 1 is a diagram schematically illustrating a wireless communication system 100 according to an exemplary embodiment of the present disclosure.

Referring to FIG. 1, the wireless communication system 100 may include a first network 120, a second network 125, and user equipments (UEs) 111 to 116. The wireless communication system 100 may be referred to as a Multi-Input Multi-Output (MIMO) system.

As a non-limiting example, the wireless communication system 100 may be a 5th generation new radio (5G NR) wireless communication system, a 4th generation long term evolution (4G LTE) wireless communication system, a Code Division Multiple Access (CDMA) system, a Wideband Code Division Multiple Access (WCDMA) system, a Global System for Mobile Communications (GSM) system, a Wireless Local Area Network (WLAN) system, or any other wireless communication system, and may be a wireless communication system in which a plurality of wireless communication methods described above are combined.

As an embodiment, the wireless communication system 100 may include a plurality of base stations (e.g., a first base station 101, a second base station 102, and a third base station 103). The base stations 101 and 102 may communicate with the UEs 111 to 116. As an example, the first base station 101 is an entity for allocating communication network resources to the first UE 111, and may refer to a fixed station that communicates with the first UE 111 and/or another base station (e.g., the second base station 102). As another example, the third base station 103 may also communicate with an Internet protocol (IP) network 130 such as the Internet, a private IP network, or other data networks. Also, the first base station 101 may exchange data and control information by communicating with another base station (e.g., the third base station 103). The plurality of base stations 101, 102, 103 may be referred to as a Node B, an evolved Node B (eNB), a next generation Node B (gNB), a sector, a site, a base transceiver system (BTS), an access point (AP), a Relay Node, a remote radio head (RRH), a radio unit (RU), a small cell, and the like. In the instant disclosure, the base station generically means some areas or functions covered by a Base Station Controller (BSC) in CDMA, a Node-B in WCDMA, an eNB in 4G LTE, a gNB or sector (site) in 5G NR, and the like, and may cover various coverage areas such as a mega cell, a macro cell, a micro cell, a pico cell, a femto cell and a relay node, an RRH, an RU, and a small cell communication range.

As shown in FIG. 1, the first base station 101 may be included in the first network 120, and the second base station 102 may be included in the second network 125. As an example, the UE 116 may access the first network 120 through the first base station 101, while accessing the second network 125 through the second base station 102. The coverage area of the first network 120 or the second network 125 may be indicated by a dashed circle in FIG. 1, and the coverage area of FIG. 1 is only an example, and may include other shapes including irregular shapes depending on the configuration and modification of the base station. The UEs 115 and 116 may communicate with the first network 120 and the second network 125 according to any Radio Access Technology (RAT). The UEs 115 and 116 may communicate with the first network 120 and the second network 125 according to the same RAT in some embodiments, and may communicate with the first network 120 and the second network 125 according to different RATs in some embodiments. The UEs 111 to 116 may transmit information in the first network 120 or the second network 125 through various multiple access methods such as Code Division Multiple Access (CDMA), Wideband Code Division Multiple Access (WCDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, OFDM-CDMA, and the like. In this case, the UEs 111 to 116 and the base stations 101 and 102 may communicate with each other, and may transmit or receive signals (or data) through various channels.

The UEs 111 to 116 are wireless communication devices, and may be defined as base station(s) (e.g., 101 and/or 102) or an entity that communicates with other UEs. The UEs 111 to 116 may be fixed or mobile, and may refer to any device capable of wirelessly communicating with the base stations 101 and 102 to transmit and receive data and/or control information. For example, the UEs 111 to 116 may be referred to as a terminal, terminal equipment, a mobile station (MS), a mobile terminal (MT), a user terminal (UT), a subscriber station (SS), a wireless device, and a handheld device.

Figure 2A:
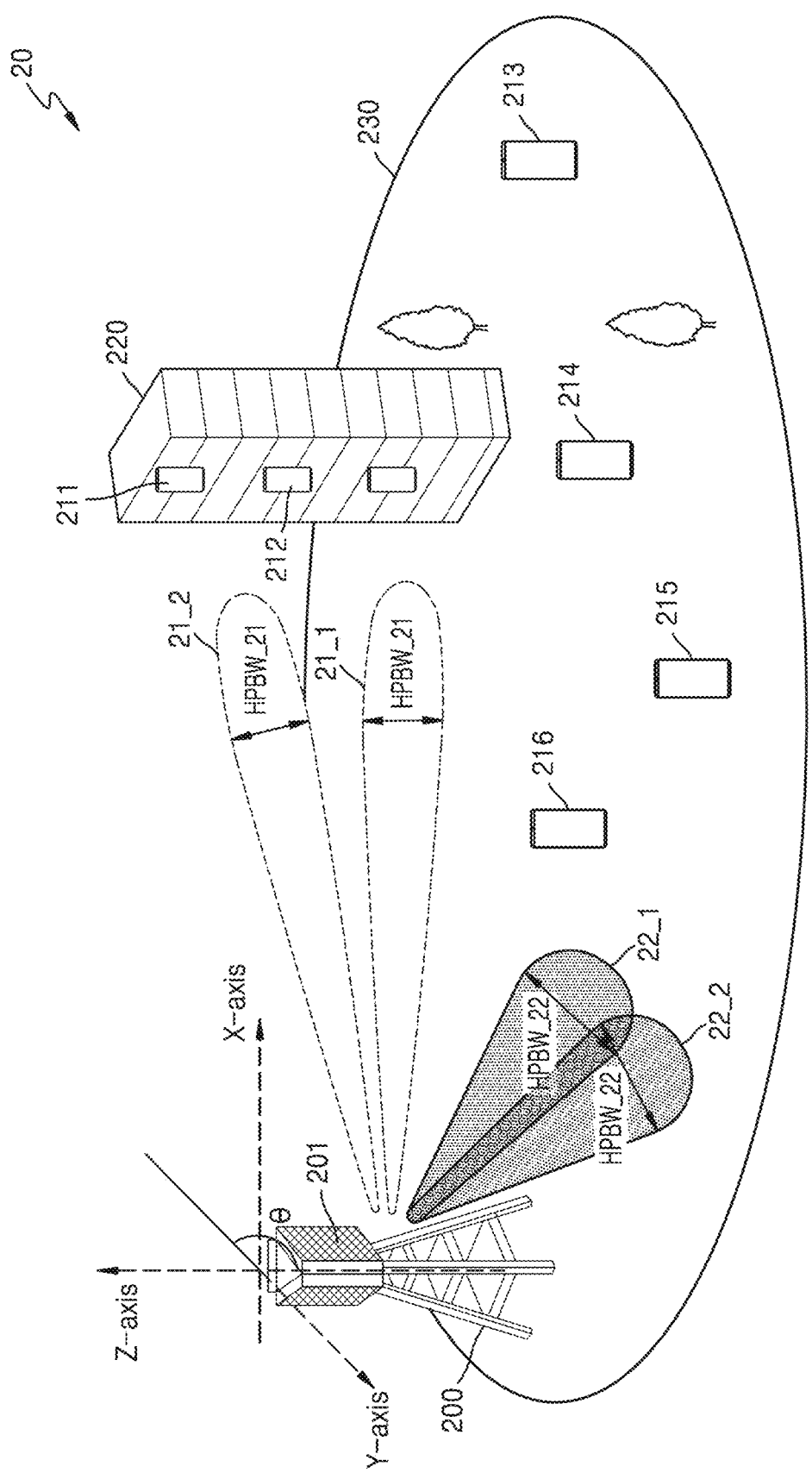
FIGS. 2A to 2B show a communication device 200 for scanning a double beam and a communication system 20 including the same according to an exemplary embodiment of the present disclosure.
Figure 2B:
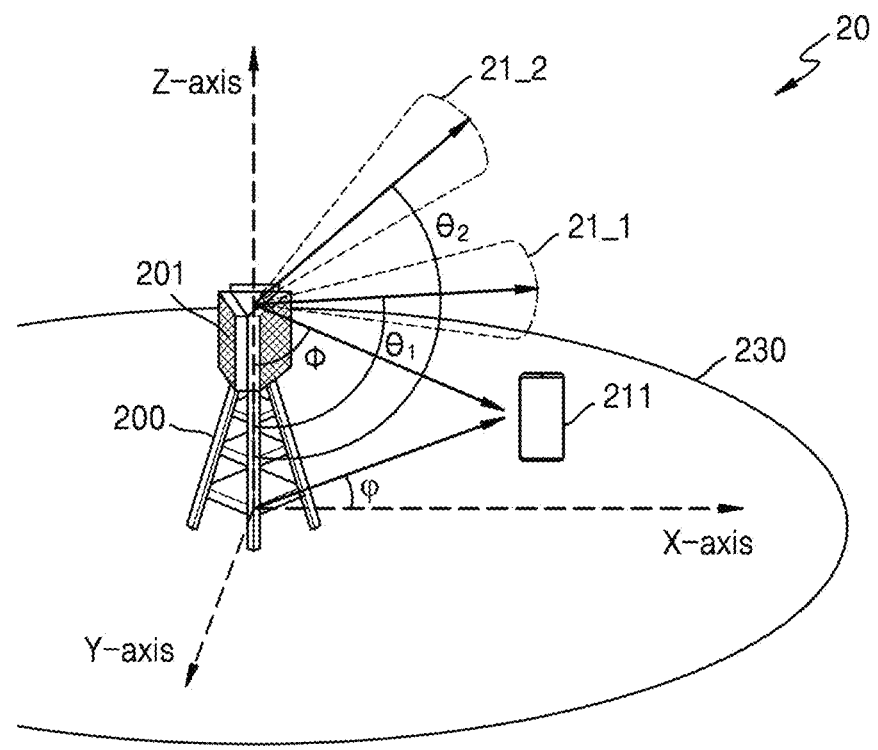

Hereinafter, the first base station 101 and the first UE 111 will be mainly described as communication elements to which the inventive scope and spirit of the present disclosure is applied. Assuming a single cell scenario, that is, without considering interference caused by the second network 125, the following embodiments of FIG. 2A to 2B are described based on a communication system including a plurality of UEs 111 to 114 within a coverage area (or cell) covered by one base station (e.g., the first base station 101) and the first network 120. However, the inventive scope of the present disclosure is not limited thereto, and of course, may be applied to a dual cell scenario and the like.

FIGS. 2A to 2B show a communication device 200 for scanning a double beam and a communication system 20 including the same according to an exemplary embodiment of the present disclosure. Hereinafter, it will be described with reference to FIG. 1.

Referring to FIG. 2A to 2B, the communication system 20 according to an embodiment of the present disclosure includes a communication device 200 and a plurality of UEs 211 to 216. Illustratively, the communication system 20 is a full dimensional multiple input multiple output (FD-MIMO) system, and the center frequency and channel bandwidth may be represented by $f_c$ and $B_w$, respectively. FD-MIMO is a technology for increasing the capacity of a wireless communication system, and corresponds to technologies that may transmit and receive large-capacity data at a high speed by using a beam having a three-dimensional structure using a plurality of antennas.

Referring to FIGS. 1 to 2B, the communication device 200 may be the first base station 101 (see FIG. 1) and may include an antenna device 201. The communication device 200 may support FD-MIMO, and the antenna device 201 included in the communication device 200 may include a plurality of active antenna arrays in a two-dimensional area. For example, the communication device 200 may use a double beam to provide elevation beamforming.

The antenna device 201 may include one or more transmission antennas and one or more receive antennas. The antenna device 201 (or one or more antennas included in the antenna device 201) may scan a beam formed by an operation based on beamforming. As an example, the antenna device 201 may include an antenna array forming a plurality of beam-formed beams 21_1, 21_2, 22_1, and 22_2.

According to FIG. 2, the communication device 200 may determine the optimal vertical tilting angle of each vertical beam by a conventional double-beams tilting (CDT) technique using two vertical beams, and the communication device 200 (or the antenna device 201 included in the communication device) may each scan a double beam having an optimal elevation angle. The vertical tilting angle θ means a vertical angle between an arbitrary beam scanned by the communication device 200 and the z-axis. CDT is technology capable of maximizing the cell throughput of the communication device 200 as a plurality of UEs 211 to 216 reuse the same resource by using two beams during any one slot (e.g., the first slot) in a single cell 230. Reuse of resources for the double beam may cause Inter-Beam Interference (IBI), which may be a major factor in performance degradation of the communication device 200. The optimal vertical tilting angle given by the CDT technique may be determined using the K-means Interference Avoidance Algorithm (KIA algorithm) considering the IBI of the double beam, and a detailed description of the KIA algorithm is described below with reference to FIG. 3.

Alternatively, in another example, the communication device 200 may determine the optimal vertical tilting angle of each vertical beam by a fractional frequency double-beams tilting (FFDT) technique using two vertical beams, and the communication device 200 (or the antenna device 201 included in the communication device) may each scan a double beam having an optimal elevation angle. In CDT, the double beam shares the entire frequency band within a single cell 230, but the FFDT divides the entire frequency band within the single cell 230 so that each beam may share a different frequency band. The optimal vertical tilting angle given by the FFDT technique is a special case of the KIA algorithm considering the IBI of the double beam, and a sub-optimal solution may be obtained by the FFDT technique.

Before determining the optimal vertical tilting angle to maximize cell throughput, with reference to FIG. 2A and 3GPP standard document TS 36.873 (Chapter 6. Scenarios for UE specific elevation beamforming and FD-MIMO), the following several points are premised.

As shown in FIG. 2A, it may be assumed that the communication system 20 according to an embodiment of the present disclosure is a downlink multi-user multi-input single-output (MU-MISO) system, and the communication system 20 may include at least one communication device 200 capable of forming and scanning a double beam and at least one UE (e.g., 211 to 216). It is assumed that there are $N_t$ number of users in the single cell 230 covered by the communication device 200, and the maximum and minimum radii of the cell are R and r, respectively. It is assumed that the height of the communication device (e.g., the base station) 200 is $h_{BS}$, and the number of antennas of the communication device 200 satisfies $n_t$. If there are two communication devices, each communication device may be divided by index b=1 or b=2, and in the following embodiments, the index b of the communication device 200 assumes a single cell scenario corresponding to b=1. In addition, the communication device 200 scans two vertical beams, and each vertical beam may be identified by an index j=1 or j=2. It is assumed that UEs are uniformly distributed horizontally and vertically in three-dimensional space, and the ratio of the UE (e.g., 211) indoors (e.g., inside a building 220) and the UE (e.g., 213) outdoors is 8:2. Although a plurality of UEs 211 to 216 are illustrated in FIG. 2A, this is only an example. When the UE (e.g., 211) is inside the building 220, the maximum number of floors of the building 220 is represented by $f_{max}$, and it is assumed that the height of each floor is 3 m. It is assumed that the height $N_r$ of the $h_{UE}$ number of users holding the UE (e.g., 213) is 1.5 m, and each UE is denoted by an index i=1 . . . , $N_r$. Also, it is assumed that each UE includes one isotropic antenna. The above prerequisites may be applied to embodiments of the present disclosure.

Referring to FIGS. 2A to 2B, the communication device 200 may scan by forming the first beam 21_1 having a first elevation angle $\theta_1$ and a first beam width, and the second beam 21_2 having a second elevation angle θ2 and a second beam width during any one slot (e.g., the first slot). As an embodiment, in order to consider only the vertical tilting angle θ, it may be assumed that a horizontal angle between the X-axis and the first beam (or the second beam) with respect to the communication device 200 uses a fixed beam of 0 degrees. As shown in FIG. 2B, ϕ means a vertical angle between the Z-axis and the UE 211 with respect to the communication device 200, and φ means a horizontal angle between the X-axis and the UE 211 with respect to the communication device 200.

Reference to "beam width" throughout this disclosure refers to "half power beam width". Half power beam width (HPBW) means the angle to the point where the power is reduced to half (10*log (0.5)=−3 dB) based on the power in the maximum beam direction, and corresponds to one indicator for the beam width. It is assumed that the beam widths of the double beams 21_1 and 21_2 scanned during any one slot are the same, and for example, the beam width of the first beam 21_1 and the beam width of the second beam 21_2 may have the same value HPBW_21.

Similar to the first and second beams described above, the communication device 200 may scan by forming the third beam 22_1 having a third elevation angle and a third beam width and the fourth beam 22_2 having a fourth elevation angle and a fourth beam width during any one slot (e.g., the second slot). It is assumed that the beam widths of the third beam 22_1 and the fourth beam 22_2 scanned during any one slot (e.g., the second slot) are the same, and for example, the beam width of the third beam 22_1 and the beam width of the fourth beam 22_2 may have the same value HPBW_22.

The antenna pattern of the communication device 200 may be expressed as an antenna gain reaching the UE 211 from the communication device 200, and is as shown in Equation (1) below.

$$G_{b,i}(\theta) = -\min\left(-\left[\begin{array}{c}-\min\left(12\left(\frac{\varphi_{b,i} - \varphi_{om}}{\varphi_{3dB}}\right)^2, SLL_{az}\right) \\ -\min\left(12\left(\frac{\varphi_{b,i} - \theta}{\theta_{3dB}}\right)^2, SLL_{el}\right)\end{array}\right], SLL_{tot}\right) \quad (1)$$

Referring to Equation (1), the communication device 200 may be defined as a b-th communication device, and the UE 211 may be defined as an i-th UE. In an embodiment, b=1, that is, the communication device 200, may be the first base station. Also, illustratively, $\theta_{b,i}$ may represent a horizontal angle between the X-axis and the i-th UE 211 with respect to the communication device 200, and $\phi_{b,i}$ may represent a vertical angle between the Z-axis and the i-th UE 211 with respect to the communication device 200. On the other hand, $\varphi_{om}$ represents the horizontal angle between the beam (for example, 21_1 or 21_2) and the X-axis, and it is assumed that a beam fixed at $\varphi_{om}=0°$ is used. $\varphi_{3\ dB}$ and $\theta_{3\ dB}$ are horizontal and vertical beam widths (e.g., HPBW_21 or HPBW_22), respectively. $SLL_{az}$ and $SLL_{el}$ denote a horizontal and vertical side lobe level (SLL), respectively, and $SLL_{tot}$ denote a total SLL. The SLL may be defined as a ratio of a peak amplitude of a main lobe to a peak amplitude of a side lobe, and may be expressed in decibels (dB).

When the distance on a two-dimensional plane from the communication device 200 to the i-th UE 211 is $d_{b,i}$, the vertical angle $\phi_{b,i}$ between the Z-axis and the i-th UE 211 relative to the communication device 200 and the horizontal angle $\varphi_{b,i}$ between the X-axis and the i-th UE 211 based on the communication device 200 may be expressed as Equations (2) and (3) through geometrical calculations, respectively.

$$\phi_{b,i} = \begin{cases} \tan^{-1}((h_{BS} - h_{UE})/d_{b,i}), & h_{BS} > h_{UE} \\ \tan^{-1}(d_{b,i}/(h_{UE} - h_{BS})) + \pi/2, & \text{else} \end{cases} \quad (2)$$

$$\varphi_{b,i} = \tan^{-1}(|y_{b,i}/x_{b,i}|) \quad (3)$$

As the communication device 200 determines an optimal vertical tilting angle for the double beam, that is, adjusts $\phi_{b,i}$ to form an optimal vertical beam, the throughput of the cell and load balancing performance may be increased.

Figure 3:
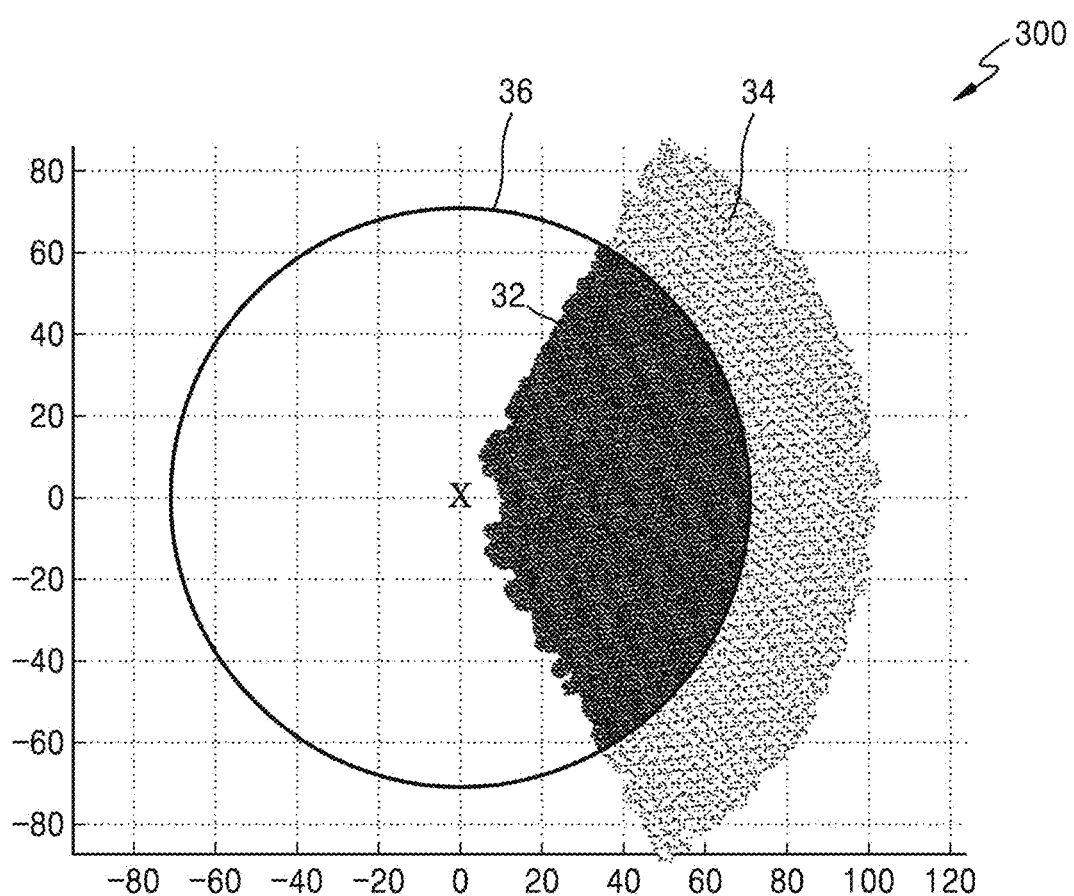
FIG. 3 shows an example of a double beam area divided based on a boundary angle $\theta_B$.
Figure 4A:
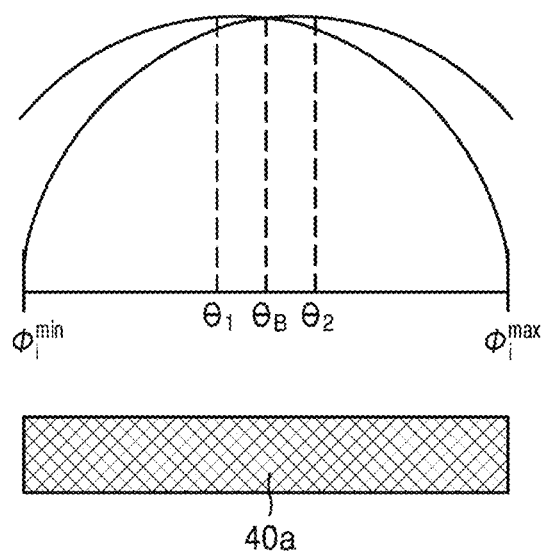
FIGS. 4A to 4C show patterns of double beams scanned by the communication device 200 of FIG. 2B.
Figure 4B:
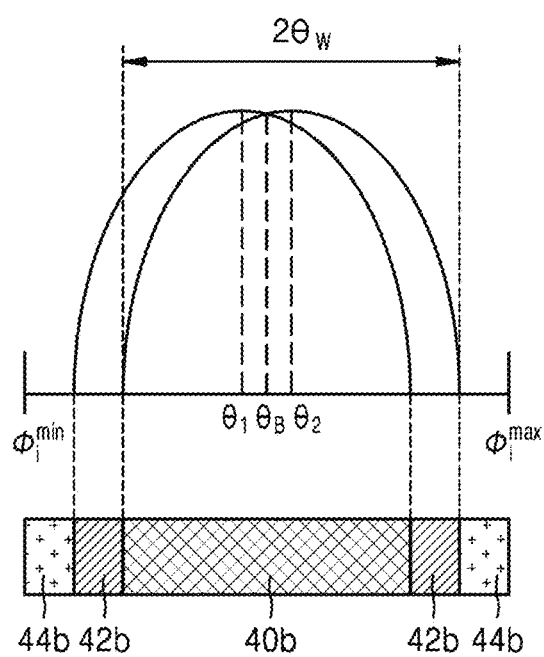
Figure 4C:
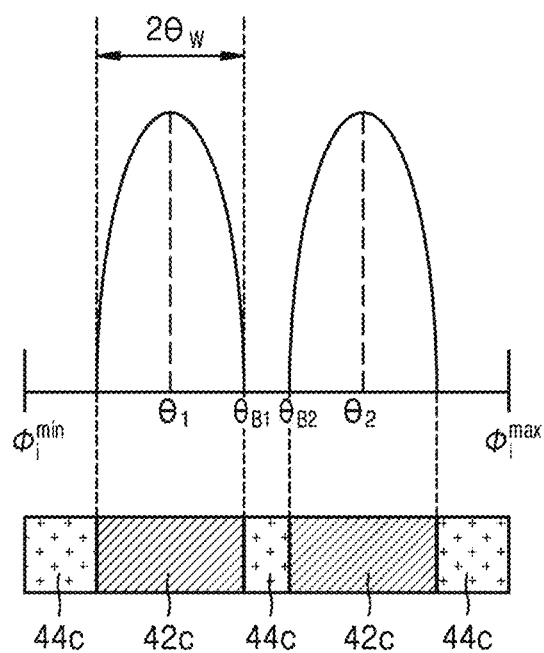

FIG. 3 shows an example of a double beam area divided based on a boundary angle $\theta_B$, and FIGS. 4A to 4C show patterns of double beams scanned by the communication device 200 of FIG. 2B. Hereinafter, it will be described with reference to the communication device 200 and the UE 211 of FIG. 2B, and for example, the communication device 200 may be referred to as a "first base station" and the UE 211 may be referred to as a "first UE".

The method of optimizing a vertical tilting angle for improving the throughput of a cell according to an embodiment of the present disclosure may be applied to the double beam patterns shown in FIGS. 4A to 4C. In other words, the communication device 200 (see FIG. 2B) according to an embodiment of the present disclosure may determine an optimal vertical tilting angle for all general beam patterns, and may transmit a signal using a beam with an optimal vertical tilting angle applied.

According to an embodiment, a method of obtaining the optimal vertical tilting angle may be performed using the KIA algorithm. The KIA algorithm according to an embodiment of the present disclosure corresponds to an algorithm using K-means clustering. K-means clustering is an algorithm that groups each segment of received data, and may be configured in such a way that data is allocated to K clusters in such a way that the distance difference between the center of the cluster to which the data segment belongs and the data is minimized.

Exemplarily, an area to which a UE is connected by a double beam within the single cell 230 (see FIG. 2B) may be divided into two (e.g., a first area and a second area) areas, and when the vertical angle that becomes the boundary separating the two regions is $\theta_B$, a group of UEs divided based on $\theta_B$ may be defined as a cluster, and according to an embodiment of the present disclosure using a double beam, the number K of clusters is K=2. $\theta_B$ may be referred to as a "boundary angle" or "boundary vertical angle", and one (e.g., $\theta_B$) or one or more (e.g., $\theta_{B1}$ and $\theta_{B2}$) boundary angles may exist according to a double beam pattern to be described below.

The graph 300 of FIG. 3 shows an example of a double beam area on a two-dimensional plane. It is assumed that the X axis and the Y axis constituting the two-dimensional plane of the graph 300 have a distance (e.g., meters) as a domain, and the communication device 200 is located at (0,0). In addition, each area of the double beam may be divided based on the boundary angle $\theta_B$. Exemplarily, UEs located in a first area 32 satisfy $\phi_{b,i}^{min} < \phi_{b,i} < \theta_B$ and may access the first beam having a vertical tilting angle of $\theta_1$. On the other hand, the terminal of a second area 34 satisfies $\theta_B < \phi_{b,i} < \phi_{b,i}^{max}$ and may connect to the second beam having a vertical tilting angle of $\theta_2$. In an embodiment of the present disclosure, the boundary angle $\theta_B$ may be calculated as $$\theta_B = \frac{\theta_1 + \theta_2}{2}.$$

Accordingly, a boundary 36 of the cluster may be determined by the values of $\theta_1$ and $\theta_2$, and may be given in the form of a circle as shown in FIG. 3.

A signal received by the i-th UE (e.g., the first UE 211) from the b-th base station (e.g., the first base station 200) is represented by $r_{b,j}$, a small-scale fading channel value between the j-th beam of the b-th base station and the i-th UE is represented by $h_{b,j,i}$, and a data symbol transmitted on the j-th beam of the b-th base station is represented by $x_{b,j}$, and assuming that $E[x_{b,j} \cdot x_{b,j}^*]=1$ is satisfied for both b and j (i.e., the energy value of the signal $r_{b,j}$ is 1), a signal $r_{b,j}$ received by the first UE 211 from the first base station 200 may be expressed as Equation (4) below.

$$r_{1,1} = \sqrt{P_{1,1}^r G_{1,1}(\theta_1)} h_{1,1,1} x_{1,1} + \sqrt{P_{1,1}^r G_{1,1}(\theta_2)} h_{1,2,1} x_{1,2} + n \quad (4)$$

Referring to Equation (4), n denotes additive white Gaussian noise (AWGN), and satisfies $n \sim N(0, \sigma_n^2)$, and P denotes transmission power.

When the three-dimensional plane distance between the b-th base station and the i-th UE is $D_{b,i}$, in the case where the signal $r_{b,i}$ is transmitted from the b-th base station, the received power $P_{b,i}^r$ of the i-th UE may be expressed by the following Equation (5).

$$p_{b,i}^r = P(4\pi D_{b,i} f_c/c)^\alpha / n_t \quad (5)$$

Referring to Equation (5), c(c=3.0×10^8 m/s) denotes the speed of light, and α denotes a path loss exponent (PLE). When a signal is received using one of the double beams from the perspective of the i-th UE, the other beam may act as an interference beam, and when the tilting angles of the beam receiving the signal and the interference beam from the viewpoint of the i-th UE are $\theta_{sig}^{(i)}$ and $\theta_{inf}^{(i)}$ (for example, $\theta_{sig}^{(i)}$ is $\theta_1$ in FIG. 2B, and $\theta_{inf}^{(i)}$ is $\theta_2$ in FIG. 2B), respectively, a signal-to-interference-plus-noise ratio (SINR) $SINR_{b,i}$ for the i-th UE may be expressed as Equation (6).

$$SINR_{1,1}(\theta_{sig}^{(1)}, \theta_{inf}^{(1)}) = \frac{P_{1,1}^r G_{1,1}(\theta_{sig}^{(1)}) |h_{1,sig,1}|^2}{\sigma^2 + P_{1,1}^r G_{1,1}(\theta_{inf}^{(1)}) |h_{1,inf,1}|^2} \quad (6)$$

The sum of throughput of a cell for all UEs (e.g., $N_t$ UEs) included in a single cell scenario is given by Equation (7) below, and therefore, the optimal double beam tilting angle for maximizing the throughput of the cell may be obtained using the following Equation (8).

$$\sum_{i=1}^{N_t} \log_2\{1 + \text{SINR}_{b,i}(\theta_{sig}^{(i)}, \theta_{inf}^{(i)})\} \quad (7)$$

$$\arg\max_{\theta_{sig}^{(i)}, \theta_{inf}^{(i)} \in (\theta_1, \theta_2)} \frac{2}{N_t} \left[\sum_{i=1}^{N_t} \log_2\{1 + \text{SINR}_{b,i}(\theta_{sig}^{(i)}, \theta_{inf}^{(i)})\}\right] \quad (8)$$

According to Equations (6) to (8), for example, the optimal vertical tilting angle of the first vertical beam included in the double beam may be determined considering the interference (e.g., IBI) of the second vertical beam, which is an interference signal, and the optimal vertical tilting angle of the second vertical beam included in the double beam may be determined considering interference (e.g., inter-beam interference: (IBI)) of the first vertical beam, which is an interference signal.

Referring to Equations (7) and (8), because the communication device 200 corresponding to the first base station 200 transmits a signal to two UEs using a double beam during an arbitrary time (e.g., one slot), ($N_t/2$) UEs may be allocated for each beam. It is assumed that each UE selects and accesses a beam having the largest SINR value considering only path loss and antenna gain. In other words, each UE may select a beam having a main lobe close to itself from among the double beams. At this time, $\theta_{sig}^{(i)}$ sig may be determined as in the following Equation (9).

$$\theta_{sig}^{(i)} = \begin{cases} \theta_1, & \phi_{b,i}^{min} < \theta_{sig}^{(i)} < \theta_B \\ \theta_2, & \theta_B < \theta_{sig}^{(i)} < \phi_{b,i}^{min} \end{cases} \quad (9)$$

Referring to Equation (9), $\phi_{b,i}^{min}$ and $\phi_{b,i}^{max}$ denote the minimum and maximum values of the possible ranges of the vertical angle of the UE, respectively, so that a plurality of UEs in the single cell 230 are all between the vertical angles $\phi_{b,i}^{min}$ to $\phi_{b,i}^{max}$. In Equations (10) and (11), r represents the minimum radius of the single cell 230, $f_{max}$ represents the maximum number of floors of the building, and $h_{BS}$ represents the height of the first base station 200. $\phi_{b,i}^{min}$ and $\phi_{b,i}^{max}$ may be given as in the following equations (10) and (11), respectively.

$$\phi_{b,i}^{min} = \tan^{-1}\frac{r}{h_{BS} - 1.5} \quad (10)$$

$$\phi_{b,i}^{min} = \tan^{-1}\left\{\frac{3(f_{max} - 1) + 1.5 - h_{BS}}{r}\right\} + \pi/2 \quad (11)$$

As mentioned above, assuming that each UE selects and accesses the beam having the largest SINR value considering only the path loss and antenna gain, Equation (8) representing the optimal double beam tilting angle may be expressed as Equation (12) below.

$$\arg\max_{\theta_1, \theta_2}\left[\sum_{\{i|\phi_{b,i}^{min}<\phi_i<\theta_B\}} \log_2\{1 + \text{SINR}_{b,i}(\theta_1, \theta_2)\} + \sum_{\{i|\theta_B<\phi_{b,i}<\phi_{b,i}^{max}\}} \log_2\{1 + \text{SINR}_{b,i}(\theta_2, \theta_1)\}\right] \quad (12)$$

In Equation (12), for example, assuming an ideal communication environment satisfying a high SINR value and $\sigma_n^2=0$ in order to simplify the optimization operation, Equation (12) may be simplified and expressed as Equation (13) below. Unlike this, because IBI of a double beam exists in an actual communication environment, the result value of the KIA algorithm may be slightly different from a simulation value.

$$\arg\max_{\theta_1, \theta_2}\left[\sum_{\{i|\phi_{b,i}^{min}<\phi_i<\theta_B\}} \log_2\{1 + \text{SNR}_{b,i}(\theta_1, \theta_2)\} + \sum_{\{i|\theta_B<\phi_{b,i}<\phi_{b,i}^{max}\}} \log_2\{1 + \text{SNR}_{b,i}(\theta_2, \theta_1)\}\right] \quad (13)$$

In Equation (13), signal-to-interference ratio (SIR) means a signal-to-interference ratio. The SIR value of the i-th UE (e.g., the first UE 211) may be determined according to which pattern the b-th base station (e.g., the first base station 200) scans the double beam from among the double beam patterns shown in FIGS. 4A and 4B. Exemplarily, the first base station 200 may form a vertical beam having various beam widths as well as various vertical tilting angles, as shown in FIGS. 4A to 4C.

FIGS. 4A to 4C show double beams with different vertical tilting angle values $\theta_1$, and $\theta_2$. The horizontal axis means the vertical angle. FIG. 4A shows a double beam pattern in the case where the vertical SLL $\theta_{3dB}$ is not applied in the possible range of the vertical angle of the UE, assuming that SLL$_{el}$ is large enough, and may be referred to as Case 1. FIGS. 4B to 4C show double beam patterns when vertical SLL$\theta_{3dB}$ is applied in a possible range of the vertical angle of the UE, assuming that SLL$_{el}$ is relatively small, and may be referred to as Case 2 and Case 3, respectively. As described above, the double beam patterns (e.g., Cases 1 to 3) may be determined by SLL $\theta_{3dB}$ perpendicular to HPBW SLL$_{el}$.

Referring to FIGS. 4A to 4C, $2\theta_W$ denotes a vertical HPBW when the vertical SLL SLL$_{el}$ is applied in a possible range of a vertical angle of the UE, and may be defined as the following Equation (14).

$$\theta_w = \sqrt{\frac{SLL_{el}}{12}}\,\theta_{3dB} \quad (14)$$

In Cases 1 to 3, because all UEs exist within the limited vertical angle range ($\phi_{b,i}^{min}<\phi_{b,i}<\phi_{b,i}^{max}$), if $\theta-\theta_W$ is less than $\phi_{b,i}^{min}$, it may be $\theta-\theta_W=\phi_{b,i}^{min}$, and if $\theta-\theta_W$ is greater than $\phi_{b,i}^{max}$, it may be $\theta+\theta_W=\phi_{b,i}^{max}$. For Case 1 to Case 3, $\theta_{B_1}$ and $\theta_{B_2}$ may be introduced for mathematical expansion to obtain the optimal vertical tilting angle.

If $\theta_1+\theta_W<\theta_B$, it is assumed that $\theta_{B_1}=\theta_1+\theta_W$, and if $\theta_1+\theta_W>\theta_B$, it is assumed that $\theta_{B_1}=\theta_B$. Similarly, if $\theta_2-\theta_W>\theta_B$, it is assumed that $\theta_{B_2}=\theta_2-\theta_W$, and if $\theta_2-\theta_W<\theta_B$, it is assumed that $\theta_{B_2}=\theta_B$. That is, in Case 1 and Case 2, $\theta_B=\theta_{B_2}=\theta_B$ is satisfied, and in Case 3, $\theta_{B_1}=\theta_1+\theta_W$ and $\theta_{B_2}=\theta_2-\theta_W$ are satisfied.

Referring to FIGS. 4A to 4C and Equation (13),

The equation for obtaining the optimal vertical tilting angles $\theta_1^*$ and $\theta_2^*$ includes an SIR for the i-th UE, and in Cases 1 to 3, the SIR value of each UE may have a different value for each area divided according to a vertical angle. For example, the equations for deriving the SIR value may be different according to whether the main lobe of the first beam and the second beam overlaps (e.g., 40a in Case 1 or 40b in Case 2), whether the main lobe of the first beam (or the second beam) and the side lobe of the second beam (or the first beam) overlap in an area (e.g., 42b in Case 2 or 42c in Case 3), or whether the side lobe of the first beam and the side lobe of the second beam overlap in an area (e.g., 44b in Case 2 or 44c in Case 3).

Because Case 1 is a case where the vertical side lobe level $SLL_{el}$ is not applied in the possible range of the vertical angle of the UE, there is only an area 40a where the main lobe of the first beam and the second beam overlap, and when the double beam formed and scanned by the b-th base station has the pattern of Case 1, the SIR of the i-th UE may be expressed as Equation (15) below.

$$SIR_{b,i}(\theta_{sig}, \theta_{inf}) = \frac{P_{b,i}^r G_{b,i}(\theta_{sig})|h_{b,1,i}|^2}{P_{b,i}^r G_{b,i}(\theta_{inf})|h_{b,2,i}|^2} = \qquad (15)$$

$$\frac{P_{b,i}^r 10^{-1.2}(\varphi_{b,i}-\varphi_{am})^2/\varphi_3\, dB^2 10^{-1.2}(\phi_{b,i}-\theta_{sig})^2/\theta_{3\,dB}^2\,|h_{b,1,i}|^2}{P_{b,i}^r 10^{-1.2}(\varphi_{b,i}-\varphi_{am})^2/\varphi_3\, dB^2 10^{-1.2}(\phi_{b,i}-\theta_{inf})^2/\theta_{3\,dB}^2\,|h_{b,2,i}|^2} =$$

$$10^{-1.2\{(\phi_{b,i}-\theta_{sig})^2 - (\phi_{b,i}-\theta_{inf})^2\}/\theta_{3\,dB}^2}|h_{b,1,i}/h_{b,2,i}|^2$$

When the result value of Equation (15) is applied to Equation (13), it may be developed as Equation (16) below.

$$\arg\max_{\theta_1,\theta_2} \qquad (16)$$

$$\left[\sum_{\{i|\theta_1-\theta_w<\phi_{b,i}<\theta_{B_1}\}} \log_2 10^{-1.2\{(\phi_{b,i}-\theta_1)^2-(\phi_{b,i}-\theta_2)^2\}/\theta_{3\,dB}^2}|h_{b,1,i}/h_{b,2,i}|^2 + \right.$$

$$\left. \sum_{\{i|\theta_{B_2}<\phi_{b,i}<\theta_2+\theta_w\}} \log_2 10^{-1.2\{(\phi_{b,i}-\theta_2)^2-(\phi_{b,i}-\theta_1)^2\}/\theta_{3\,dB}^2}|h_{b,2,i}/h_{b,1,i}|^2\right] =$$

$$\arg\max_{\theta_1,\theta_2} \sum_{\{i|\theta_1-\theta_w<\phi_{b,i}<\theta_{B_1}\}} \log_2 10^{-1.2\{(\phi_{b,i}-\theta_1)^2-(\phi_{b,i}-\theta_2)^2\}/\theta_{3\,dB}^2} +$$

$$\sum_{\{i|\theta_{B_2}<\phi_{b,i}<\theta_2+\theta_w\}} \log_2 10^{-1.2\{(\phi_{b,i}-\theta_2)^2-(\phi_{b,i}-\theta_1)^2\}/\theta_{3\,dB}^2} +$$

$$\sum_{\{i|\theta_1-\theta_w<\phi_{b,i}<\theta_{B_1}\}} \log_2|h_{b,1,i}/h_{b,2,i}|^2 + \sum_{\{i|\theta_{B_2}<\phi_{b,i}<\theta_2+\theta_w\}} \log_2|h_{b,2,i}/h_{b,1,i}|^2 =$$

$$\arg\min_{\theta_1,\theta_2}\left[\sum_{\{i|\theta_1-\theta_w<\phi_{b,i}<\theta_{B_1}\}}\{(\phi_{b,i}-\theta_1)^2-(\phi_{b,i}-\theta_2)^2\}+ \right.$$

$$\left.\sum_{\{i|\theta_{B_2}<\phi_{b,i}<\theta_2+\theta_w\}}\{(\phi_{b,i}-\theta_2)^2-(\phi_{b,i}-\theta_1)^2\}\right]$$

Because Case 2 is a case where vertical SLL $SLL_{el}$ is applied and the first beam and the second beam partially overlap, in the range $\phi_{b,i}^{min}<\phi_{b,i}<\phi_{b,i}^{max}$ of vertical angles where the UE exists, there may be an area 40b where the main lobe of the first beam and the second beam overlap, an area 42b where the main lobe of the first beam (or the second beam) and the side lobe of the second beam (or the first beam) overlap, and an area 44b where the side lobe of the first beam and the side lobe of the second beam overlap.

If the double beam formed and scanned by the b-th base station has the pattern of Case 2, in relation to the SIR of the i-th UE, Equation (16) may be similarly applied to the area 40b where the main lobes of the first beam and the second beam overlap, and the SIR for the i-th UE for the remaining two areas 42b and 44b may be expressed as Equations (17) and (18) below, respectively.

$$SIR_{b,i}(\theta_{sig},\theta_{inf})=10^{0.1\{-12(\phi_{b,i}-\theta_{sig})^2/\theta_{3\,dB}^2-SLL_{el}\}}|h_{b,1,i}/h_{b,2,i}|^2 \qquad (17)$$

$$SIR_{b,i}(\theta_{sig},\theta_{inf})=|h_{b,1,i}/h_{b,2,i}|^2 \qquad (18)$$

Equation (17) represents the SIR for the i-th UE in the area 42b where the main lobe of the first beam (or the second beam) and the side lobe of the second beam (or the first beam) overlap, and Equation (18) represents the SIR for the i-th UE in the area 44b where the side lobe of the first beam and the side lobe of the second beam overlap.

As described above, when the double beam formed and scanned by the b-th base station has the pattern of Case 2, the SIR for the i-th UE considering all three areas 40b, 42b, and 44b may be expressed as Equation (19) below.

$$\arg\max_{\theta_1,\theta_2}\left[\sum_{\{i|\phi_{b,i}^{min}<\phi_i<\theta_1-\theta_W\}}\log_2|h_{b,1,i}/h_{b,2,i}|^2 + \right. \qquad (19)$$

$$\sum_{\{i|\theta_1-\theta_w<\phi_{b,i}<\theta_2-\theta_w\}}\log_2 10^{0.1\{-12(\phi_{b,i}-\theta_1)^2/\theta_{3\,dB}^2-SLL_{el}\}}|h_{b,1,i}/h_{b,2,i}|^2 +$$

$$\sum_{\{i|\theta_2-\theta_w<\phi_{b,i}<\theta_{B_1}\}}\log_2 10^{-1.2\{(\phi_{b,i}-\theta_1)^2-(\phi_{b,i}-\theta_2)^2\}/\theta_{3\,dB}^2}|h_{b,1,i}/h_{b,2,i}|^2 +$$

$$\sum_{\{i|\theta_{B_2}<\phi_{b,i}<\theta_1+\theta_w\}}\log_2 10^{-1.2\{(\phi_{b,i}-\theta_2)^2-(\phi_{b,i}-\theta_1)^2\}/\theta_{3\,dB}^2}|h_{b,2,i}/h_{b,1,i}|^2 +$$

$$\sum_{\{i|\theta_1-\theta_w<\phi_{b,i}<\theta_2-\theta_w\}}\log_2 10^{0.1\{-12(\phi_{b,i}-\theta_1)^2/\theta_{3\,dB}^2-SLL_{el}\}}|h_{b,2,i}/h_{b,1,i}|^2 +$$

$$\left.\sum_{\{i|\theta_2-\theta_w<\phi_i<\phi_{b,i}^{max}\}}\log_2|h_{b,2,i}/h_{b,1,i}|^2\right] =$$

$$\arg\min_{\theta_1,\theta_2}\left[\sum_{\{i|\theta_1-\theta_w<\phi_{b,i}<\theta_{B_1}\}}(\phi_{b,i}-\theta_1)^2 - \sum_{\{i|\theta_2-\theta_w<\phi_{b,i}<\theta_{B_2}\}}(\phi_{b,i}-\theta_2)^2 + \right.$$

$$\left.\sum_{\{i|\theta_{B_2}<\phi_{b,i}<\theta_2+\theta_w\}}(\phi_{b,i}-\theta_2)^2 - \sum_{\{i|\theta_{B_1}<\phi_{b,i}<\theta_1+\theta_w\}}(\phi_{b,i}-\theta_1)^2\right]$$

Case 3 is a case where vertical SLL $SLL_{el}$ is applied, and there may be the area 42c where the main lobe of the first beam (or the second beam) and the side lobe of the second beam (or the first beam) overlap and the area 44c where the side lobe of the first beam and the side lobe of the second beam overlap in the range $(\phi_{b,i}^{min}<\phi_{b,i}<\phi_{b,i}^{max})$ of vertical angles where the UE exists.

Illustratively, when the double beam formed and scanned by the b-th base station has the pattern of Case 3, in relation to the SIR for the i-th UE, Equations (17) and (18) may be similarly applied to the area 42c where the main lobe of the first beam (or the second beam) and the side lobe of the second beam (or the first beam) overlap and the area 44c where the side lobe of the first beam and the side lobe of the second beam overlap, respectively, and accordingly, when Equations (17) and (18) are applied to Equation (13), it may be expressed as Equation (20) below.

$$\arg\max_{\theta_1,\theta_2} \qquad (20)$$

$$\left[\sum_{\{i|\phi_{b,i}^{min}<\phi_{b,i}<\theta_1-\theta_w\}}\log_2|h_{b,1,i}/h_{b,2,i}|^2 + \right.$$

$$\sum_{\{i|\theta_1-\theta_w<\phi_{b,i}<\theta_{B_1}\}}\log_2 10^{0.1\{-12(\phi_{b,i}-\theta_1)^2/\theta_{3\,dB}^2-SLL_{el}\}}|h_{b,1,i}/h_{b,2,i}|^2 +$$

$$\sum_{\{i|\theta_{B_1}<\phi_{b,i}<\theta_{B_2}\}}\log_2|h_{b,1,i}/h_{b,2,i}|^2 +$$

$$\sum_{\{i|\theta_{B_2}<\phi_{b,i}<\theta_2+\theta_w\}}\log_2 10^{0.1\{-12(\phi_{b,i}-\theta_2)^2/\theta_{3\,dB}^2-SLL_{el}\}}|h_{b,2,i}/h_{b,1,i}|^2 +$$

$$\left.\sum_{\{i|\theta_2+\theta_w<\phi_{b,i}<\phi_{b,i}^{max}\}}\log_2|h_{b,2,i}/h_{b,1,i}|^2\right] =$$

-continued $$\arg\min_{\theta_1,\theta_2}\left\{\sum_{\{i|\theta_1-\theta_w<\phi_{b,i}<\theta_{B_1}\}}(\phi_{b,i}-\theta_1)^2 + \sum_{\{i|\theta_{B_2}<\phi_{b,i}<\theta_2+\theta_w\}}(\phi_{b,i}-\theta_2)^2\right\}$$

For all cases of the double beam pattern covering Case 1 to Case 3, the optimal vertical tilting angle may be determined by integrating Equation (16) of Case 1, Equation (19) of Case 2, and Equation (20) of Case 3 by minimizing the following function $h(\theta_1, \theta_2)$, and the function $h(\theta_1, \theta_2)$ may be expressed as the following Equation (21).

$$h(\theta_1, \theta_2) = \tag{21}$$

$$\sum_{\{i|\theta_1-\theta_w<\phi_{b,i}<\theta_{B_1}\}}(\phi_{b,i}-\theta_1)^2 - \sum_{\{i|\theta_2-\theta_w<\phi_{b,i}<\theta_{B_2}\}}(\phi_{b,i}-\theta_2)^2 +$$

$$\sum_{\{i|\theta_{B_2}<\phi_{b,i}<\theta_2+\theta_w\}}(\phi_{b,i}-\theta_2)^2 - \sum_{\{i|\theta_{B_1}<\phi_{b,i}<\theta_1+\theta_w\}}(\phi_{b,i}-\theta_1)^2 =$$

$$h_1(\theta_1, \theta_2) + h_2(\theta_1, \theta_2)$$

$h_1(\theta_1, \theta_2)$ and $h_2(\theta_1, \theta_2)$ in Equation (21) may be expressed by Equation (22) below.

$$h_1(\theta_1, \theta_2) = \sum_{\{i|\theta_1-\theta_w<\phi_{b,i}<\theta_{B_1}\}}(\phi_{b,i}-\theta_1)^2 - \tag{22}$$

$$\sum_{\{i|\theta_{B_1}<\phi_{b,i}<\theta_1+\theta_w\}}(\phi_{b,i}-\theta_1)^2 h_2(\theta_1, \theta_2) =$$

$$\sum_{\{i|\theta_{B_2}<\phi_{b,i}<\theta_2+\theta_w\}}(\phi_{b,i}-\theta_2)^2 - \sum_{\{i|\theta_2-\theta_w<\phi_{b,i}<\theta_{B_2}\}}(\phi_{b,i}-\theta_2)^2$$

In equations (21) and (22), a function $\theta_1$ that takes both the vertical tilting angle $\theta_2$ and the vertical tilting angle $h(\theta_1,\theta_2)$ as variables does not correspond to a convex function or a concave function. In other words, as the method to determine the optimal vertical tilting angles $\theta_1^*$ and $\theta_2^*$ uses the argmin function for finding $\theta_1$ and $\theta_2$ to make the function $h(\theta_1,\theta_2)$ to a minimum value, if the full search methodology cannot be applied, only a local solution may be obtained. Here, "solution" means the optimal vertical tilting angles $\theta_1^*$ and $\theta_2^*$.

Therefore, according to an embodiment of the present disclosure, in Equation (21), a solution may be obtained in the form of repeating the process of fixing $\theta_1$ (i.e., treating it as a constant) and determining $\theta_2$ that minimizes $h_2(\theta_1,\theta_2)$ after fixing $\theta_2$ (i.e., treating it as a constant) and determining $\theta_1$ that minimizes $h_1(\theta_1, \theta_2)$. Exemplarily, when two clusters (e.g., a first cluster and a second cluster) corresponding to two areas are designated by arbitrary $\theta_1$ and $\theta_2$, the equation for obtaining the optimal vertical tilting angle $\theta_1^*$ may be expressed as the following Equation (23).

$$\operatorname*{argmin}_{\theta_1} h_1(\theta_1, \theta_2) = \operatorname*{argmin}_{\theta_1} \tag{23}$$

$$\left\{(N_1-N_2)\theta_1^2 - 2\left(\sum_{\{i|\theta_1-\theta_w<\phi_{b,i}<\theta_{B_1}\}}\phi_{b,i} - \sum_{\{i|\theta_{B_1}<\phi_{b,i}<\theta_1+\theta_w\}}\phi_{b,i}\right)\theta_1 +\right.$$

$$\left.\sum_{\{i|\theta_1-\theta_w<\phi_{b,i}<\theta_{B_1}\}}\phi_{b,i}^2 - \sum_{\{i|\theta_{B_1}<\phi_{b,i}<\theta_1+\theta_w\}}\phi_{b,i}^2\right\}$$

In Equation (23), $N_1$ denotes the number of UEs in which the vertical angle $\phi_{b,i}$ satisfies $\theta_1-\theta_w<\phi_{b,i}<\theta_{B_1}$ (e.g., the number of UEs included in the first cluster), and $N_2$ denotes the number of UEs in which the vertical angle $\phi_{b,i}$ satisfies $\theta_{B_1}<\phi_{b,i}<\theta_1+\theta_w$ (e.g., the number of UEs included in the second cluster). In other words, $N_1$ means the number of UEs for which a beam with a vertical tilting angle of $\theta_1$ becomes a desired signal (that is, a beam with a vertical tilting angle of $\theta_2$ is an interference signal), and $N_2$ means the number of UEs for which a beam having a vertical tilting angle of $\theta_2$ becomes a desired signal (that is, a beam having a vertical tilting angle of $\theta_1$ is an interference signal). Accordingly, Equation (23) may be divided into a case where $N_1-N_2$ is greater than 0 and a case where $N_1-N_2$ is less than 0.

Specifically, when $N_1-N_2>0$, $h_1(\theta_1, \theta_2)$ included in Equation (23) may be expanded as Equation (24) below. $f(\theta_1)$ is a function that fixes and treats $\theta_2$ as a constant and uses $\theta_1$ as a variable and means a function representing $h_1(\theta_1, \theta_2)$, and when $N_1-N_2>0$, $f(\theta_1)$ corresponds to a convex function.

$$f(\theta_1) = \tag{24}$$

$$(N_1-N_2)\theta_1^2 - 2\left(\sum_{\{i|\theta_1-\theta_w<\phi_{b,i}<\theta_{B_1}\}}\phi_{b,i} - \sum_{\{i|\theta_{B_1}<\phi_{b,i}<\theta_1+\theta_w\}}\phi_{b,i}\right)\theta_1 +$$

$$\sum_{\{i|\theta_1-\theta_w<\phi_{b,i}<\theta_{B_1}\}}\phi_{b,i}^2 - \sum_{\{i|\theta_{B_1}<\phi_{b,i}<\theta_1+\theta_w\}}\phi_{b,i}^2$$

As a result, the optimal vertical tilting angle $\theta_1^*$ according to Equation (24) is the following Equation (25).

$$\theta_1^* = \frac{\sum_{\{i|\theta_1-\theta_w<\phi_{b,i}<\theta_{B_1}\}}\phi_{b,i} - \sum_{\{i|\theta_{B_1}<\phi_{b,i}<\theta_1+\theta_w\}}\phi_{b,i}}{N_1-N_2} \tag{25}$$

On the other hand, when $N_1-N_2<0$, $f(\theta_1)$ corresponds to a concave function. When $N_1-N_2<0$, $\theta-\theta_w$ or $\theta_{B_1}$, with smaller $f(\theta_1)$ values among the $f(\theta_1)$ values by substituting $\theta-\theta_w$ or $\theta_{B_1}$ for $\theta_1$ may be the optimal vertical tilting angle $\theta_1^*$. That is, in the case of a concave function, when there is one of the values at both ends within the entire range (that is, the domain) of the variable $\theta_1$, the minimum value of $f(\theta_1)$ may be found, and because the range of $\theta_1$ is $\theta_1-\theta_w<\phi_{b,i}<\theta_{B_1}$, $\theta-\theta_w$ or $\theta_{B_1}$ may be substituted for $\theta_1$. According to the embodiment, because $f(\theta_1)$ always satisfies $f(\theta_1-\theta_w)<f(\theta_{B_1})$ in all ranges of the variable $\theta_1$ when $N_1-N_2<0$, the optimal vertical tilting angle $\theta_1^*$ is expressed by the following Equation (26).

$$\theta_1^*=\theta_1-\theta_w \tag{26}$$

Depending on which of $N_1$ and $N_2$ has the greater value, the optimal vertical tilting angle $\theta_1^*$ may be determined by Equation (25) or Equation (26).

An optimal vertical tilting angle $\theta_2^*$ may also be obtained in the same manner as described above, and descriptions previously given are omitted as redundant.

Figure 6:
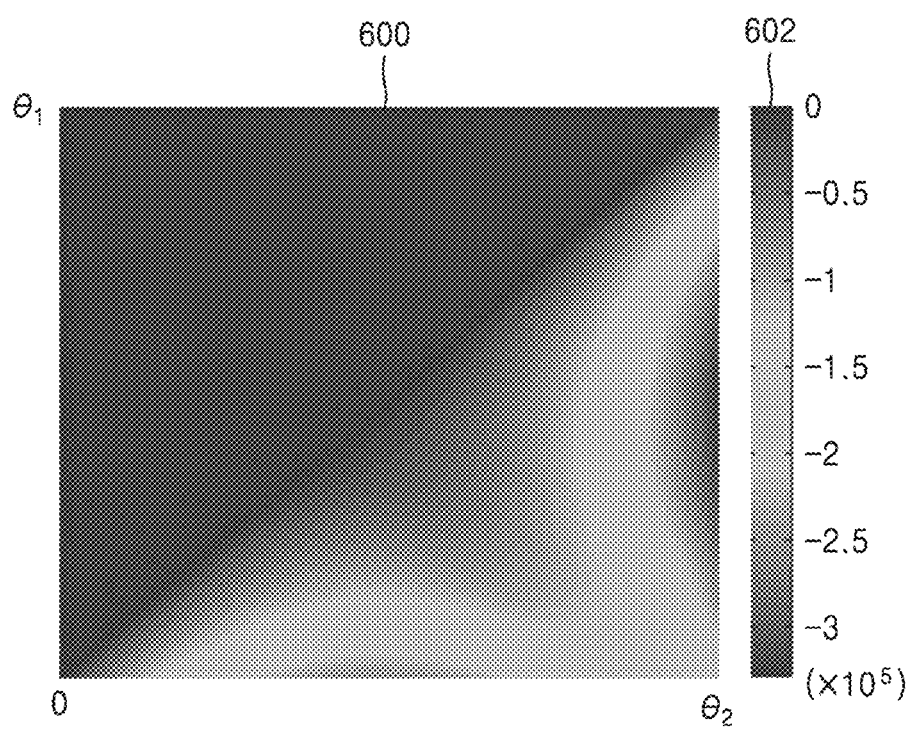
FIG. 6 is an example of a graph 600 representing $h(\theta_1, \theta_2)$ when a double beam pattern in the case where a vertical side lobe level is not applied.

FIG. 5 shows a table summarizing the optimal vertical tilting angle $\theta_1^*$ and $\theta_2^*$ according to the number of UEs included in the clusters, and FIG. 6 is an example of a graph 600 indicating $h(\theta_1, \theta_2)$ in the case of a double beam pattern when vertical SLL is not applied.

Referring to table 500 of FIG. 5, the optimal vertical tilting angles $\theta_1^*$ and $\theta_2^*$ according to the number of UEs in the first cluster and the second cluster are divided based on the boundary angles $\theta_{B_1}$ and $\theta_{B_2}$ shown. For example, the first cluster and the second cluster may correspond to a group of UE(s) included in each of the first area and the second area in a single cell divided by the boundary angle $\theta_{B_1}$ or $\theta_{B_2}$. $N_3$ denotes the number of UEs of which the vertical angle $\phi_{b,i}$ satisfies $\theta_2-\theta_w<\phi_{b,i}<\theta_{B_2}$, and $N_4$ denotes the number of UEs of which the vertical angle $\phi_{b,i}$ satisfies $\theta_{B_2}<\phi_{b,i}<\theta_2+\theta_w$.

Referring to FIGS. 4A and 5, assuming Case 1 corresponding to a beam pattern to which vertical SLL is not applied, $N_1=N_3$ and $N_2=N_4$ are satisfied. At this point, if $N_1-N_2>0$, $$\theta_1^* = \frac{\sum_{\{i|\theta_1-\theta_w<\phi_{b,i}<\theta_{B_1}\}} \phi_{b,i} - \sum_{\{i|\theta_{B_1}<\phi_{b,i}<\theta_1+\theta_w\}} \phi_{b,i}}{N_1 - N_2}$$

and $\theta_2^*=\theta_2+\theta_w=\phi_{b,i}^{max}$ are satisfied, and if $N_1-N_2<0$, $\theta_1^*=\theta_1-\theta_w=\phi_{b,i}^{min}$ and $$\theta_2^* = \frac{\sum_{\{i|\theta_{B_2}<\phi_{b,i}<2+\theta_w\}} \phi_{b,i} - \sum_{\{i|\theta_2-\theta_w<\phi_{b,i}<\theta_{B_2}\}} \phi_{b,i}}{N_4 - N_3}$$

are satisfied. Therefore, in Case 1, there are two local optimal solutions according to two situations ($N_1-N_2>0$ or $N_1-N_2<0$).

Referring to FIG. 6, when Case 1 corresponding to a beam pattern to which vertical SLL is not applied is considered, shows an example of graph 600 showing $\phi_{b,i}^{min}<\theta_1<\theta_2<\phi_{b,i}^{max}$ when 1000 samples of $\theta_1$ and $\theta_2$ are acquired under the condition of $h(\theta_1, \theta_2)$.

As shown in FIG. 6, assuming $\phi_{b,i}^{min}<\theta_1<\theta_2<\phi_{b,i}^{max}$ in the embodiments of the present disclosure, the value of $h(\theta_1, \theta_2)$ may be fixed to 0 for the part of $\theta_1>\theta_2$, which is an area outside of this range. $h(\theta_1, \theta_2)$ consists of two convex parts, and there are two local solutions. According to the graph 602 representing the scale of $h(\theta_1, \theta_2)$, in the range of $\phi_{b,i}^{min}<\theta_1<\theta_2<\phi_{b,i}^{max}$, and depending on the two variables, the tilting angles $\theta_1$ and $\theta_2$, $h(\theta_1, \theta_2)$ may have a negative value.

According to an embodiment of the present disclosure, as a way to find the optimal tilting angle $\theta_1^*$ and $\theta_2^*$, a method of fixing $\theta_1$ (i.e., treating it as a constant) and determining $\theta_2$ that minimizes $h_2(\theta_1, \theta_2)$ after fixing $\theta_2$ (i.e., treating it as a constant) and determining $\theta_1$ that minimizes $h_1(\theta_1, \theta_2)$ may be used, this is similar to the K-means clustering algorithm. However, in the K-means clustering (K-means clustering) algorithm, the objective function in each cluster is given only as a function of the distance from the center point, but in the KIA algorithm according to an embodiment of the present disclosure, an element (e.g., $\theta\text{inf}^{(i)}$) generated by interference between beams may be additionally reflected in the objective function. That is, IBI of different beams may be included as a variable of the objective function.

However, because the method of obtaining the optimal vertical tilting angle according to an embodiment of the present disclosure cannot obtain one optimal solution due to its characteristics, by iteratively performing the optimization (e.g., iteratively performing up to M times) from an arbitrary number (e.g., N) of starting points, the optimal solution may be selected from the results.

Figure 7:
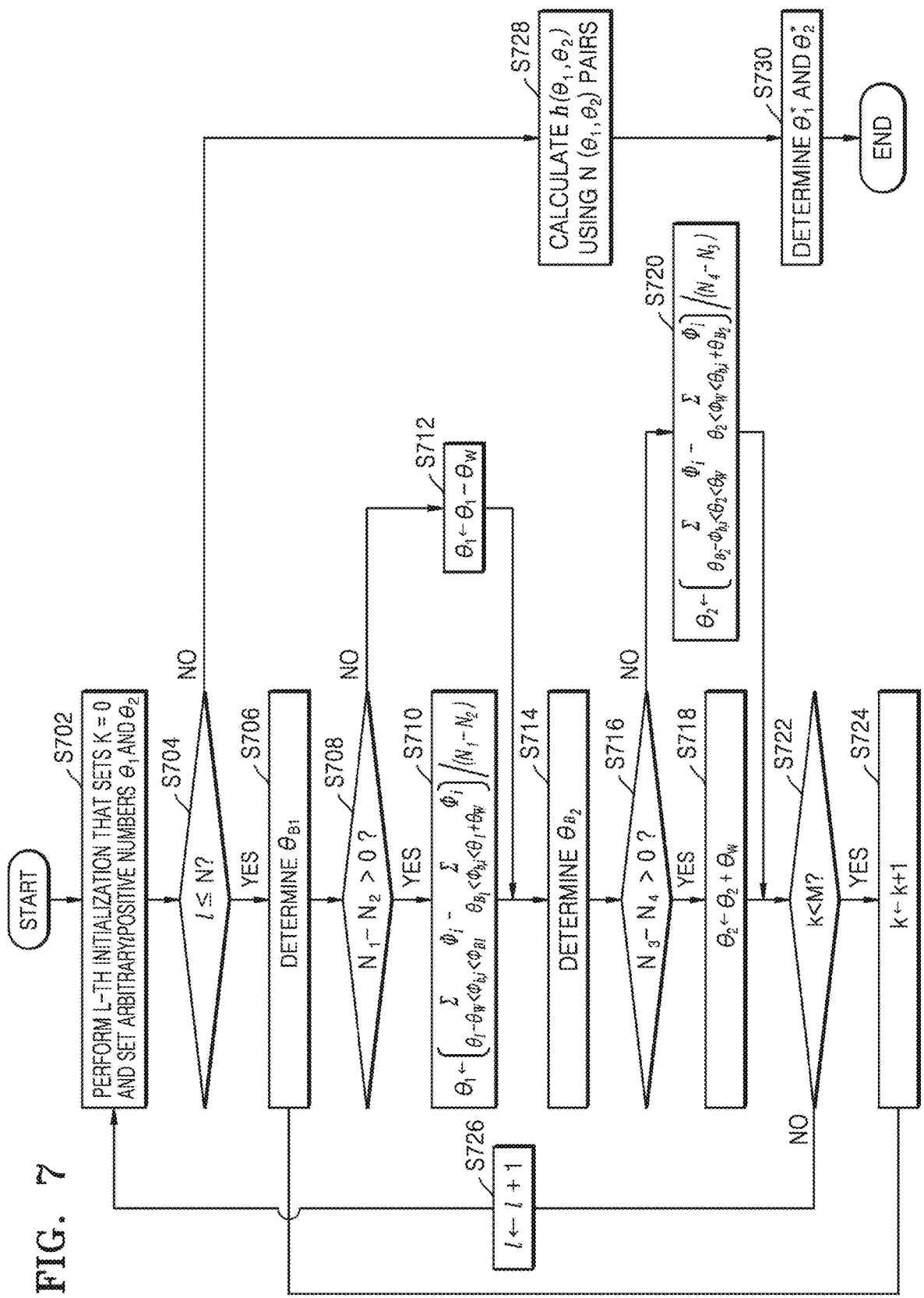
FIG. 7 is a flowchart illustrating a KIA algorithm for obtaining the optimal vertical tilting angles $\theta_1^*$ and $\theta_2^*$ with respect to the double beam pattern of FIGS. 4A to 4C.

FIG. 7 is a flowchart illustrating a KIA algorithm for obtaining the optimal vertical tilting angles $\theta_1^*$ and $\theta_2^*$ with respect to the double beam pattern of FIGS. 4A to 4C.

Referring to FIG. 7, in order for the base station to obtain an optimal unique solution that covers all cases of the double beam pattern (i.e., the double beam patterns shown in FIGS. 4A to 4C), optimization may be iteratively performed (e.g., iteratively performed up to M times) from an arbitrary number (e.g., N) of starting points using the above-described equations. Here, the N starting points may mean N pairs of $\theta_1$ and $\theta_2$ (e.g., $N(\theta_1, \theta_2)$). M is an arbitrary predetermined positive constant and denotes the total number of iterations of S706 to S720 to be described below, N is an arbitrary predetermined positive constant and may denote the total number of iterations of S702 to be described below.

In S702, the base station may perform l-th initialization that sets k (k is a positive integer) to 0 and sets $\theta_1$ and $\theta_2$ to arbitrary positive constants. In step S702, an initialization operation of setting $\theta_1$ and $\theta_2$ as arbitrary positive constants may be referred to as a "first operation".

According to an embodiment of the present disclosure, k means the number of iterations of S706 to S720 to be described below, and for example, when k=3, which is a value less than or equal to M, it may mean that S706 to S720 are iterated three times. In addition, l means the number of iterations of initialization corresponding to S702, and for example, when l=5, which is a value less than or equal to N, it may mean that S702 is iterated five times. Illustratively, it may be initially set to l=1, and at this time, a first initialization may be performed. Also, $\theta_1$ and $\theta_2$ may be set to satisfy the $\phi_{b,i}^{min}<\theta_1<\theta_2<\phi_{b,i}^{max}$ condition.

In S704, the base station may determine whether l has a value less than or equal to N.

In S706, when it is determined that l has a value less than or equal to N, a boundary angle $\theta_{B_1}$ that satisfies $\theta_1-\theta_w<\phi_{b,i}<\theta_{B_1}$ and $\theta_{B_1}<\phi_{b,i}<\theta_1+\theta_w$ conditions may be determined.

In S728, if it is determined that l has a value greater than N, $h(\theta_1, \theta_2)$ it is computed using the N $(\theta_1, \theta_2)$ pairs obtained without further performing the algorithm, and in S730, the optimal vertical tilting angles $\theta_1^*$ and $\theta_2^*$ may be determined by selecting $\theta_1$ and $\theta_2$ that minimize $h(\theta_1, \theta_2)$.

In S708, the base station may determine whether $N_1$ has a value greater than $N_2$. In S710, if it is determined that $N_1$ has a value greater than $N_2$, $$\theta_1 = \left(\sum_{\{i|\theta_1-\theta_w<\phi_{b,i}<\theta_{B_1}\}} \phi_i - \sum_{\{i|\theta_{B_1}<\phi_{b,i}<\theta_1+\theta_w\}} \phi_i\right)/(N_1 - N_2)$$

may be substituted for $\theta_1$. On the other hand, in S712, when it is determined that $N_1$ has a value less than or equal to $N_2$, $\theta_1-\theta_w$ may be substituted for $\theta_1$. Depending on whether the number of UEs included in the first cluster are divided according to the boundary angle $\theta_{B_1}$ in steps S708 to S712 has a value greater than the number of UEs included in the second cluster, the operation of calculating $\theta_1$ and $\theta_2$ may be referred to as a "second operation".

In S714, the base station may determine a boundary angle $\theta_{B_2}$ that satisfies $\theta_2-\theta_w<\phi_{b,i}<\theta_{B_2}$ and $\theta_{B_2}<\phi_{b,i}<\theta_2+\theta_w$ conditions.

In S716, the base station may determine whether $N_3$ has a value greater than $N_4$. In S718, if it is determined that $N_3$ has a value greater than $N_4$, $\theta_2+\theta_w$ may be substituted for $\theta_2$. On the other hand, in S720, when it is determined that $N_3$ has a value less than or equal to $N_4$, $$\theta_2 = \left(\sum_{\{i|\theta_{B_2}<\phi_{b,i}<\theta_2+\theta_w\}} \phi_i - \sum_{\{i|\theta_2-\theta_w<\phi_{b,i}<\theta_{B_2}\}} \phi_i\right)/(N_4 - N_3)$$

may be substituted for $\theta_2$. Depending on whether the number of UEs included in the first cluster are divided according to the boundary angle $\theta_{B_2}$ in steps S716 to S720 has a value greater than the number of UEs included in the second cluster, the operation of calculating $\theta_1$ and $\theta_2$ may be referred to as a "second operation".

In S722, the base station may determine whether k has a value less than M. In S724, if it is determined that k has a value smaller than M, the base station may substitute k+1 for k, return to S706, and repeat S706 to S720.

In S726, when k has a value greater than or equal to M, the base station may substitute l+1 for l, return to S702, and perform (l+1)-th initialization. In other words, after the M-th optimization is repeatedly performed by the l-th initialization (that is, when the M-th $\theta_1$ and $\theta_2$ are determined), the (l+1)-th initialization with a different starting point may be performed. As k approaches M, more optimized $\theta_1$ and $\theta_2$ may be calculated, and for example, one M-th optimal $\theta_1$ and $\theta_2$ may be obtained by a first initialization operation.

Because $\theta_{B_1}=\theta_{B_2}=\theta_B$ in Case 1 and Case 2, when the double beam pattern corresponds to Case 1 and Case 2, the above-described S714 to S720 may be omitted.

The KIA algorithm according to an embodiment of the present disclosure may perform a total of M optimizations by using $(\theta_1, \theta_2)$, which are different pairs of N random positive constants, as a starting point of an algorithm using K-means clustering. $h(\theta_1, \theta_2)$ (see Equation (21)) for the N M-th optimal vertical tilting angles for each of N $(\theta_1, \theta_2)$, and the optimal vertical tilting angle $\theta_1^*$ and $\theta_2^*$ may be determined.

Therefore, according to a communication device and an operating method thereof according to an exemplary embodiment of the present disclosure, the optimal vertical tilting angle of a double beam using a vertical beam using the KIA algorithm considering the double beam IBI may be determined. Accordingly, optimization of multiple vertical beams in all cases having a general beam pattern may be performed, and thus, there is an effect of increasing throughput and load balancing performance of a cell.

Figure 8:
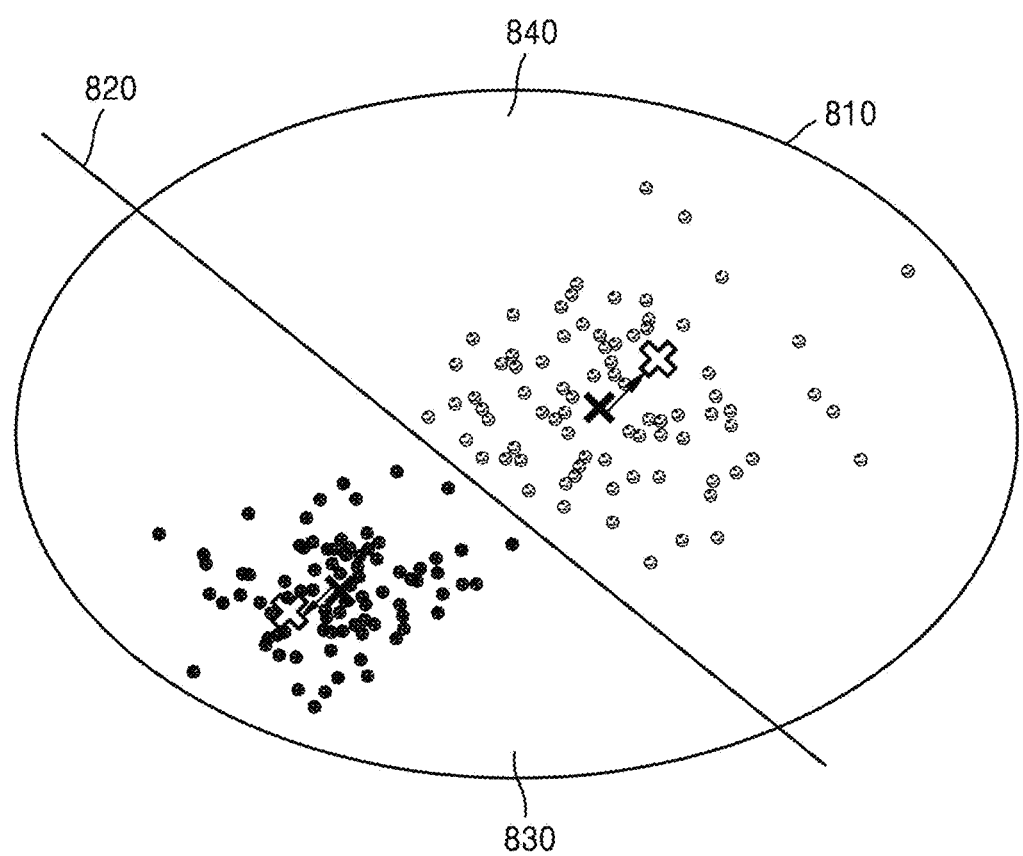
FIG. 8 is a diagram showing a comparison of the optimal vertical tilting angle determined using the KIA algorithm according to an embodiment of the present disclosure with the optimal vertical tilting angle determined using the algorithm using the conventional K-means clustering.

FIG. 8 is a diagram showing a comparison of the optimal vertical tilting angle determined using the KIA algorithm according to an embodiment of the present disclosure with the optimal vertical tilting angle determined using the algorithm using the conventional K-means clustering.

According to FIG. 8, there are a plurality of UEs in a single cell 810, and the plurality of UEs in the single cell 810 may be divided into a first cluster 830 including at least one UE and a second cluster 840 including at least one UE based on the boundary angle $\theta_B$ 820.

Exemplarily, the single cell 810 of FIG. 8 may correspond to the single cell 230 of FIG. 2B, the boundary angle $\theta_B$ 820 of FIG. 8 may correspond to the boundary 36 of the cluster in FIG. 2B, the first cluster 830 of FIG. 8 may correspond to the first area 32 of FIG. 2B, and the second cluster 840 of FIG. 8 may correspond to the second area 34 of FIG. 2B.

The first center 850 is the center point of each cluster determined by the conventional K-means clustering algorithm, and may denote the optimal vertical tilting angle determined by the K-means clustering algorithm.

On the other hand, the second center 860 is the center point of each cluster determined by the KIA algorithm according to an embodiment of the present disclosure, and may denote the optimal vertical tilting angle determined by additionally considering the factor caused by the interference between beams in the objective function.

According to the above-mentioned equations and the KIA algorithm according to the flowchart of FIG. 7, in order to minimize interference from other clusters, when compared with the first center 850 corresponding to the optimal vertical tilting angle when using the K-means clustering algorithm in which the objective function is given only as a function of the distance from the center point, each cluster may have a tendency to be determined as the second center 860 corresponding to the optimal vertical tilting angle $\theta_1^*$ and $\theta_2^*$ having a large difference from the boundary angle $\theta_B$ (820). The inventive scope of the present disclosure is not limited thereto, and it is apparent that other factors or other variables may have different tendencies depending on the added KIA algorithm.

Figure 9A:
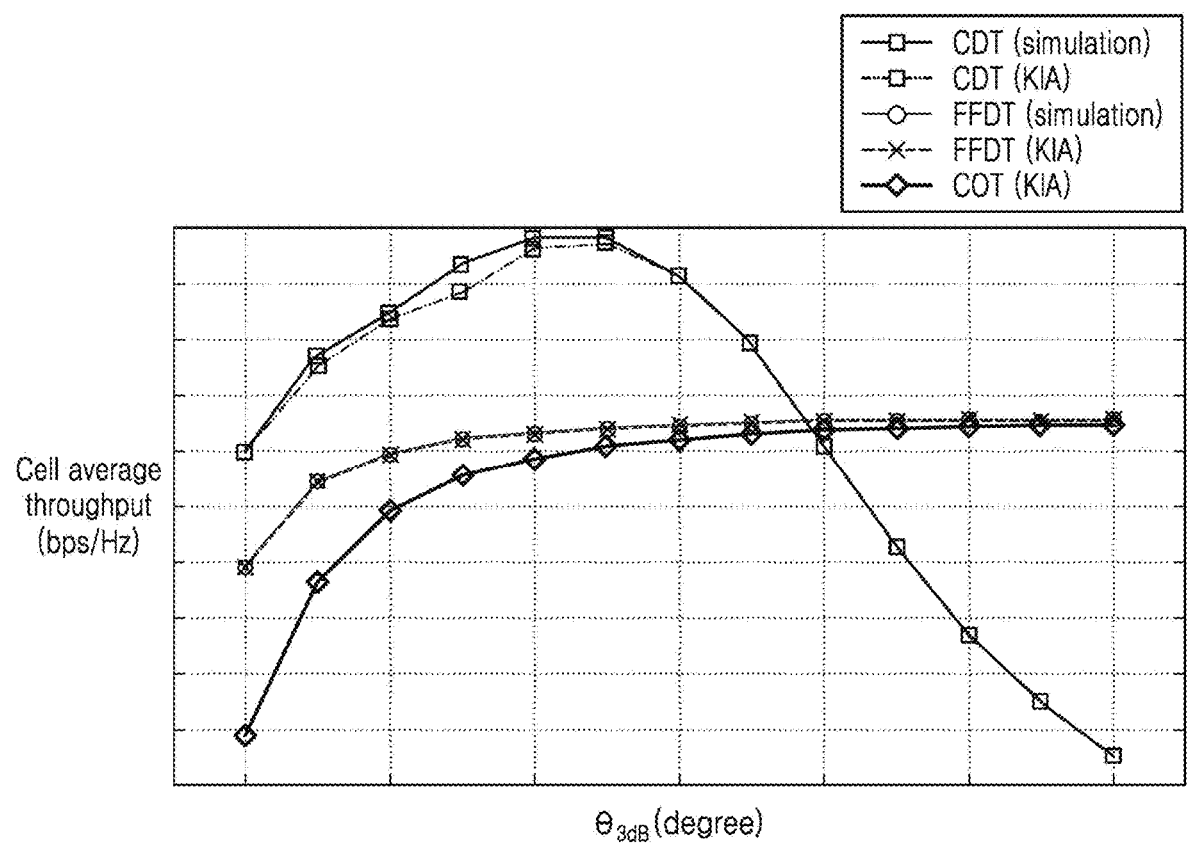
FIG. 9A is a graph illustrating average cell throughput according to half power beam width in a single cell scenario according to an exemplary embodiment of the present disclosure.

FIG. 9A is a graph illustrating average cell throughput according to HPBW in a single cell scenario according to an exemplary embodiment of the present disclosure.

The graph of FIG. 9A shows a simulation result of cell average throughput of a single cell according to a half power beam width (HPBW) through the conventional double-beam tilting (CDT), fractional frequency double-beams tilting (FFDT) and conventional one beam tilting (COT) techniques and an analysis result according to the KIA algorithm.

According to the CDT technique, when HPBW $\theta_{3dB}$ is greater than a specific angle (e.g., 30 degrees), as $\theta_{3dB}$ decreases, the average cell throughput may increase. When HPBW $\theta_{3dB}$ is less than or equal to a specific angle (e.g., 30 degrees), as HPBW $\theta_{3dB}$ becomes smaller, the reduced beam width not only reduces the power of the interference signal, but also reduces the power of the signal to be received, thereby reducing the average cell throughput, so that as a result, the average cell throughput may be reduced.

On the other hand, according to the FFDT technique, since there is no inter-beams interference (IBI), the cell average throughput increases as the beam width increases.

The simulation results of FFDT (FFDT(simulation)) and the analysis results according to the KIA algorithm of FFDT (FFDT(KIA)) show consistent trends within the entire HPBW range, and in the case of CDT, there may be some differences between the simulation results and the graphs according to the analysis results according to the KIA algorithm. This is because, as mentioned in Equation (12), in the analysis result (CDT(KIA)) according to the KIA algorithm, analysis was performed assuming a high SINR value. According to the FFDT technique, since there is no IBI, the actual SNR has a high SNR value, and according to the CDT technique, since IBI exists, the actual SINR may be different from that assuming a high SINR value. In particular, since the case of the double beam pattern of Case 2 corresponding to FIG. 4B has the largest IBI, the difference between the simulation result and the analysis result may be greatest.

According to the FFDT technique, the cell average throughput may be measured higher than the COT technique, and this is because interference between beams may be mitigated through the frequency division method. In particular, as the HPBW $\theta_{3dB}$ is smaller, the effect of the FFDT technique is remarkable.

Figure 9B:
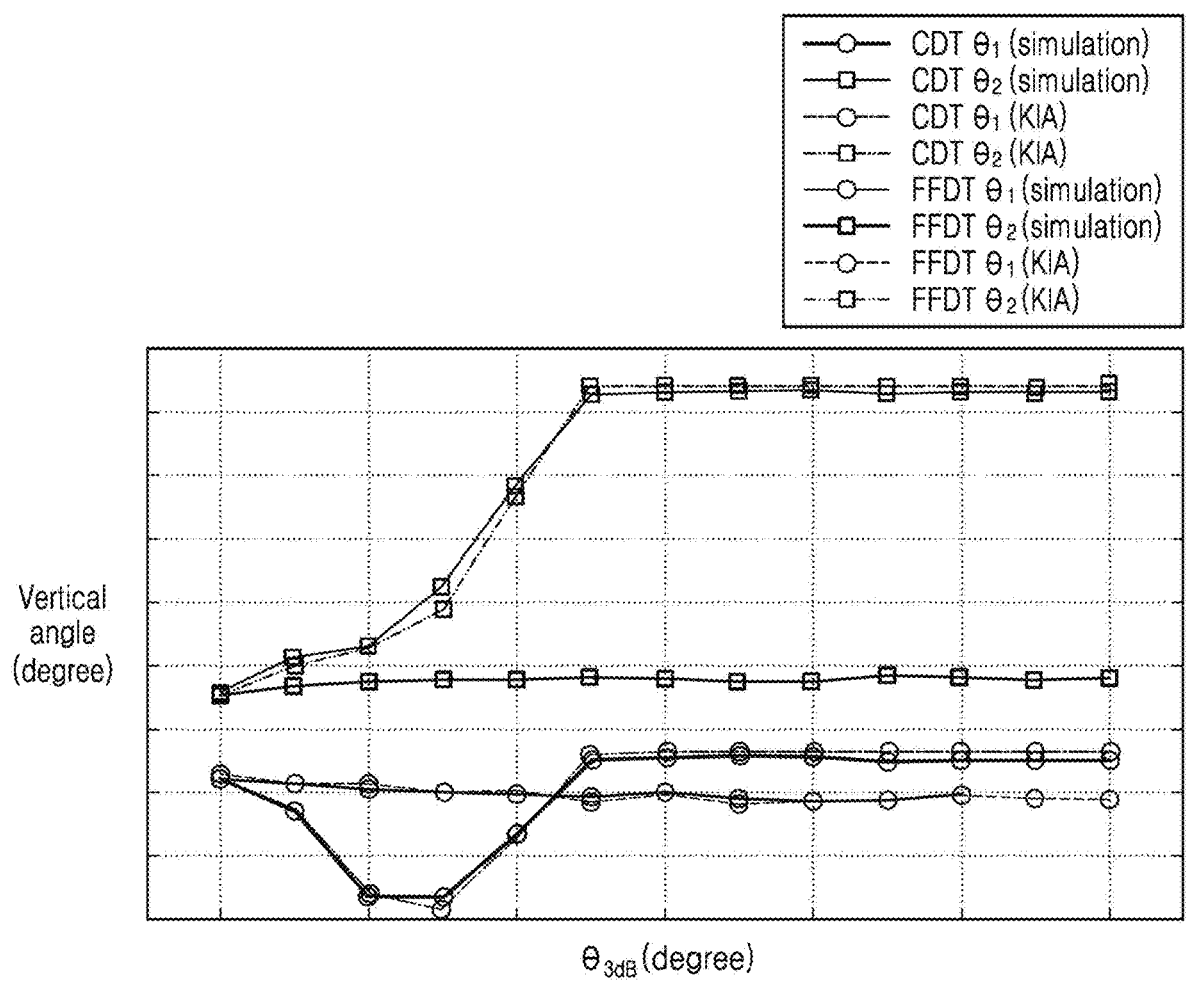
FIG. 9B is a graph illustrating an optimal vertical tilting angle determined according to half power beam width in a single cell scenario according to an exemplary embodiment of the present disclosure.

FIG. 9B is a graph illustrating an optimal vertical tilting angle determined according to HPBW in a single cell scenario according to an exemplary embodiment of the present disclosure.

According to the CDT technique of FIG. 9B, as an example, when HPBW $\theta_{3dB}$ is in a specific range (e.g., 30 degrees to 65 degrees), the optimal vertical tilting angle $\theta_1^*$ and $\theta_2^*$ of the first and second beams indicates that the first beam (or second beam) avoids the second beam (or first beam) on the other side. That is, it may mean that the difference value between $\theta_1^*$ and $\theta_2^*$ has a relatively large value. This may cause a critical performance decrease in terms of load balancing, but at the HPBW $\theta_{3dB}$ below a specific angle (for example, 30 degrees), the vertical tilting angle of the double beam is concentrated at the center, and according to FIG. 9B, as the HPBW $\theta_{3dB}$ becomes smaller, the simulation results and analysis results of the FFDT technique are almost identical.

As mentioned with reference to FIG. 9A, the simulation results of FFDT (FFDT(simulation)) and the analysis results according to the KIA algorithm of FFDT (FFDT(KIA)) show consistent trends within the entire HPBW range, and in the case of CDT, there may be some differences between the simulation results and the graphs according to the analysis results according to the KIA algorithm due to IBI.

Figure 9C:
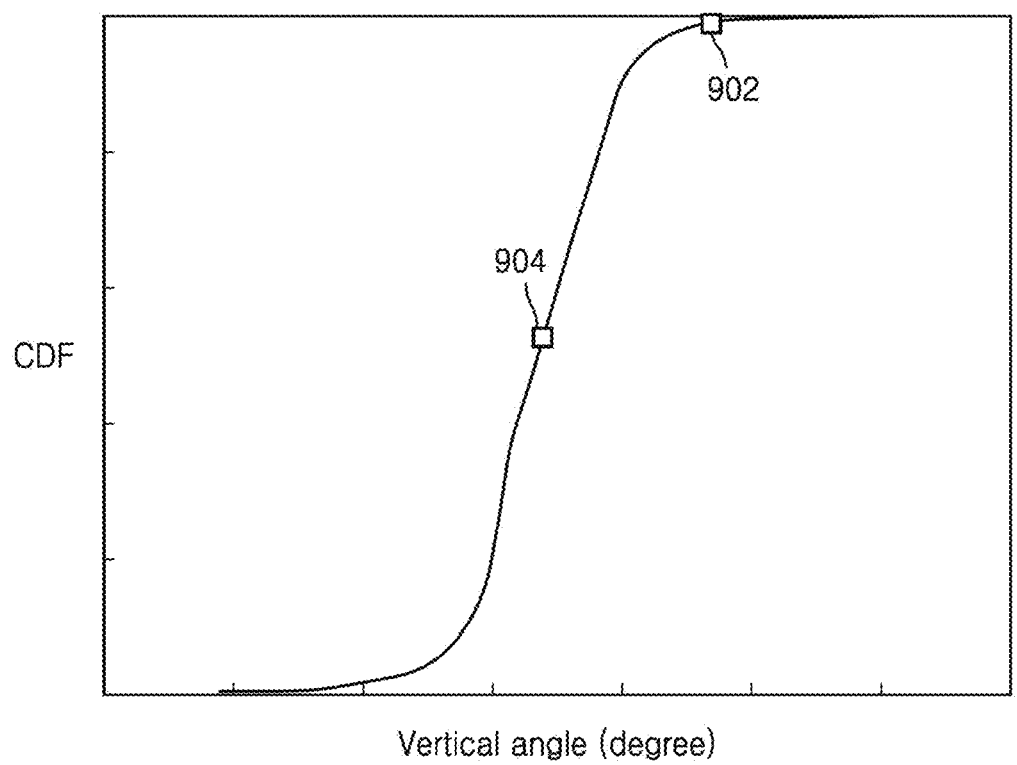
FIG. 9C is a graph illustrating load balancing according to a boundary angle with respect to the double beam pattern of FIG. 4A.

FIG. 9C is a graph illustrating load balancing according to a boundary angle with respect to the double beam pattern of FIG. 4A.

Exemplarily, the graph of FIG. 9C is a graph showing a ratio of UEs covered by the first beam and the second beam according to the boundary angle in the form of a cumulative distribution function (CDF).

For example, according to the CDT technique, the boundary angle $\theta_B$ may be about 113 degrees, and a ratio of the number of UEs accessing the first beam to all UEs included in a single cell may be 0.98 (902). At this time, the UEs may be connected to the first beam and the second beam having respective optimal vertical tilting angles $\theta_1^*$ and $\theta_2^*$ in a ratio of 0.98:0.02. According to the CDT technique, as the IBI increases, one beam covers most of the area and the other beam tends to be avoided to reduce interference.

Illustratively, in the case of the double beam pattern of Case 1, when $N_1-N_2>0$ or $N_1-N_2<0$, the optimal vertical tilting angles $\theta_1^*$ and $\theta_2^*$ satisfy $\theta_1=\phi_{b,i}^{min}$ and $\theta_2=\phi_{b,i}^{max}$. This may mean, for example, that the second beam is avoided to the maximum extent possible for the first cluster to which more UEs belong.

As another example, according to the FFDT technique, the boundary angle $\theta_B$ may be about 88 degrees, and a ratio of the number of UEs accessing the first beam to all UEs included in a single cell may be 0.52 (904). Because there is no IBI according to the FFDT technique, UEs may be connected to the first beam and the second beam having optimal vertical tilting angles $\theta_1^*$ and $\theta_2^*$, respectively, at a ratio of 0.52:4802, and have relatively good results in terms of load balancing.

Figure 10:
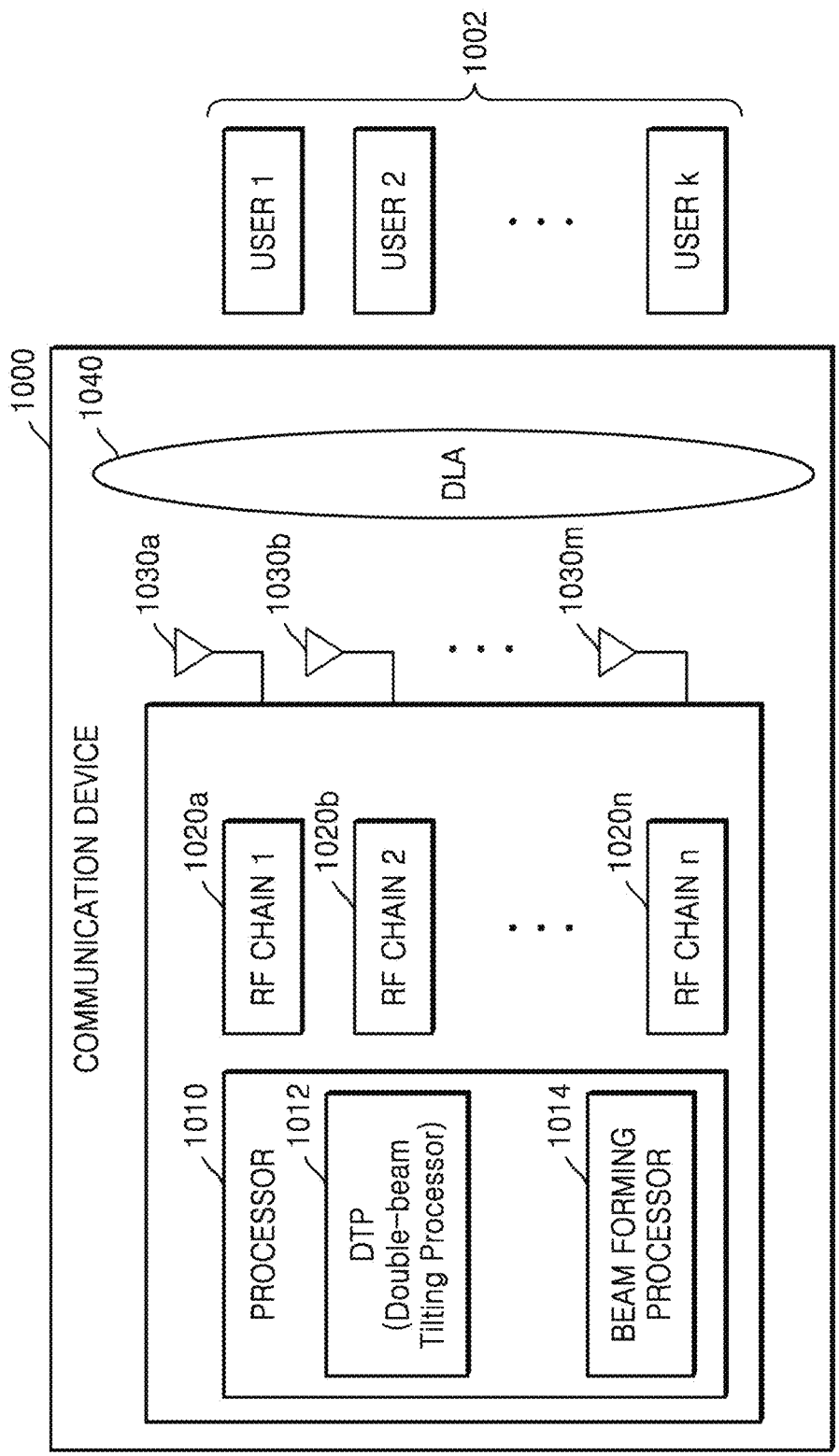
FIG. 10 is a block diagram schematically showing the configuration of a communication device 1000 according to an exemplary embodiment of the present disclosure.

FIG. 10 is a block diagram schematically showing the configuration of a communication device 1000 according to an exemplary embodiment of the present disclosure.

The communication device 1000 may include a processor 1010, a plurality of RF chain circuits 1020*a* to 1020*n*, a plurality of antennas 1030*a* to 1030*m*, and a discrete lens array (DLA) 1040. Although not shown in the drawing, the communication device 1000 may further include a transceiver including at least one digital-to-analog converter (DAC) and at least one analog-to-digital converter (ADC). Each of the components included in the communication device 1000 may be a hardware block designed through logic synthesis including an analog circuit and/or a digital circuit, and UEs may be connected to a first beam and a second beam having respective optimal vertical tilting angles $\theta_1^*$ and $\theta_2^*$ in a ratio of 0.98:0.02. Each component may be a software block including a plurality of instructions executed by a processor or the like.

In some embodiments, the processor 1010 may include a double-beam tilting processor (DTP) 1012 and a beam forming processor 1014. The processor 1010 may be a baseband processor that controls or processes a baseband signal. The processor 1010 generates data as a transmission signal to at least one UE among the k UEs 1002 to form a beam using the DTP 1012 and the beam forming processor 1014. Exemplarily, the DTP 1012 is not limited to two beams, and may determine an optimal vertical tilting angle of a plurality of vertical beams as well as a double beam. The beam forming processor 1014 may determine beamforming for transmitting a signal by using uplink channel information estimated as a reference signal received from each UE 1002.

The first to nth RF chains 1020*a* to 1020*n* are circuits for amplifying a signal generated by the processor 1010 or removing noise, and may be collectively referred to as a plurality of RF chain circuits. For example, the RF chain circuit may include a band pass filter (BPF), a low noise amplifier (LNA), a mixer, an amplifier, and a frequency down converter.

In addition, the number of the first RF chain to the n-th RF chain 1020*a* to 1020*n* may be less than the number of the plurality of antennas 1030*a* to 1030*m*. When the number of the first RF chain to the nth RF chain 1020*a* to 1020*n* is less than the number of the plurality of antennas 1030*a* to 1030*m*, the communication device 1000 may select an antenna corresponding to the number of a plurality of RF chain circuits 1020*a* to 1020*n*, and transmit a signal to the DLA 1040 through a corresponding antenna.

The DLA 1040 may generate a beamforming signal by refracting signals output from the plurality of antennas 1030*a* to 1030*m*. The degree of a refracted signal through the DLA 1040 may be different depending on the location of each of the plurality of antennas 1030*a* to 1030*m*, and accordingly, the communication device 1000 may transmit a signal to the location of each UE 1002 based on beamforming.

The plurality of antennas 1030*a* to 1030*m* may include at least one antenna, and receive an RF signal from the at least one UE 1002 or may transmit an RF signal to the at least one UE 1002. In some embodiments, the plurality of antennas 1030*a* to 1030*m* may be implemented in the form of the antenna array 110 to support Multi-Input Multi-Output (MIMO).

Each of the UEs 1002 may receive a signal transmitted from the communication device 1000 through at least one antenna. The communication system including the communication device 1000 and the UEs 1002 may be a system in which communication is performed in a Multi User-Multi Input Single Output (MU-MISO) method, but is not limited thereto, and for example, a communication system including a communication device 1000 and UEs 1002 may be a system in which communication is performed in a Multi User-Multi Input Multi Output (MU-MIMO) method by receiving a signal from the communication device 1000 through the UEs 1002 through a plurality of antennas.

Figure 11:
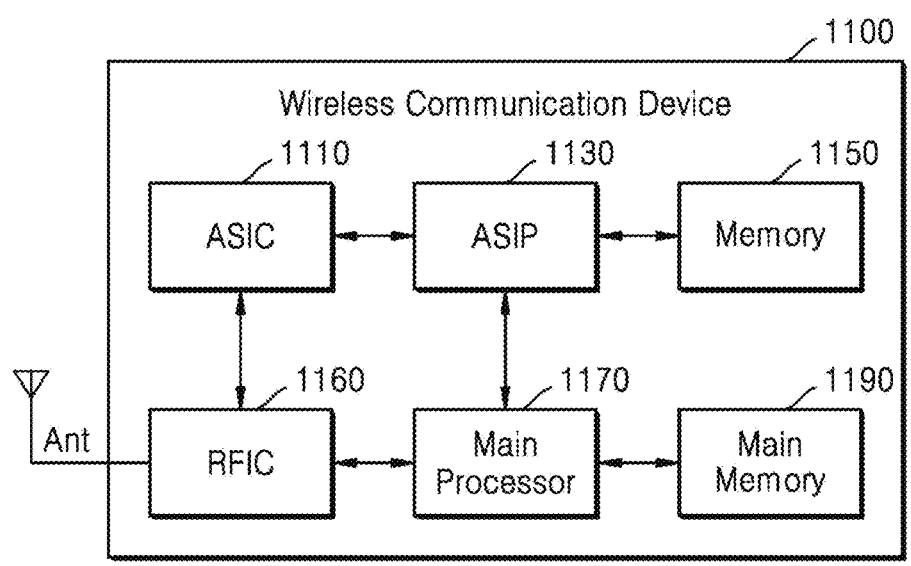
FIG. 11 is a block diagram of a communication device 1100 according to an exemplary embodiment of the present disclosure.

FIG. 11 is a block diagram of a communication device 1100 according to an exemplary embodiment of the present disclosure.

Referring to FIG. 11, the communication device 1100 may include a MODEM (not shown) and a Radio Frequency Integrated Circuit (RFIC) 1160, and the modem may include an application specific integrated circuit (ASIC) 1110, an application specific instruction set processor (ASIP) 1130, a memory 1150, a main processor 1170, and a main memory 1190. The communication device 1100 of FIG. 11 may be a first base station according to an embodiment of the present disclosure.

The RFIC 1160 may be connected to the antenna Ant to receive a signal from the outside or transmit a signal to the outside using a wireless communication network. The RFIC 1160 may include the receiving circuits or the transceiver. The RFIC 1160 may transmit and receive a plurality of carrier wave signals to and from the modem. According to an embodiment of the present disclosure, the RFIC 1160 may transmit a signal to at least one UE included in the first cluster using a first beam having a first optimal vertical tilting angle, and transmit the signal to at least one UE included in the second cluster by using the second beam.

The ASIP 1130 is an integrated circuit customized for a specific use, and may support a dedicated instruction set for a specific application, and may execute instructions included in the instruction set. The memory 1150 may communicate with the ASIP 1130 and may store a plurality of instructions executed by the ASIP 1130 in a non-transitory storage device. For example, the memory 1150 may include, by way of non-limiting example, random access memory (RAM), read only memory (ROM), tape, magnetic disk, optical disk, volatile memory, non-volatile memory, and any combinations thereof; and also may include any type of memory accessible by the ASIP 1130.

The main processor 1170 may control the communication device 1100 by executing a plurality of instructions. For example, the main processor 1170 may control the ASIC 1110 and the ASIP 1130, process data received through a wireless communication network, or process a user input to the communication device 1100. According to an embodiment of the present disclosure, the main processor 1170 may perform operations according to each step of the KIA algorithm. The main processor 1170 may cluster UEs into a first cluster including at least one UE and a second cluster including at least one UE in a single cell, initialize a vertical tilting angle of each of the first vertical beam and the second vertical beam to obtain the first and second initialized vertical tilting angles, and calculate the first and second vertical tilting angles according to whether the number of UEs included in the first cluster has a value greater than the number of UEs included in the second cluster. Also, the main processor 1170 may calculate at least one boundary angle that separates the first cluster and the second cluster, and may determine optimal vertical tilting angles $\theta_1^*$ and $\theta_2^*$.

The main memory 1190 may communicate with the main processor 1170 and may store a plurality of instructions executed by the main processor 1170 in a non-transitory storage device. For example, the main memory 1190 may include, by way of non-limiting example, random access memory (RAM), read only memory (ROM), tape, magnetic disk, optical disk, volatile memory, non-volatile memory, and combinations thereof and also may include any type of memory accessible by the main processor 1170. According to an embodiment of the present disclosure, the main memory 1190 may store the M-th optimal $\theta_1$ and $\theta_2$ calculated according to each initialization operation of the KIA algorithm, and may store the optimal vertical tilting angles $\theta_1^*$ and $\theta_2^*$.

While the inventive concept has been particularly shown and described with reference to embodiments thereof, it will be understood that various changes and modifications in form and details may be made therein without departing from the spirit and scope of the following claims.

What is claimed is:

1. A communication device that performs beamforming, the communication device comprising:
    an antenna array configured to simultaneously form a first vertical beam and a second vertical beam for an arbitrary time;
    a transceiver configured to transmit and receive a signal using a double beam including the first vertical beam and the second vertical beam; and
    a processor configured to determine, using a K-means interference avoidance (KIA) algorithm, a first optimal vertical tilting angle of the first vertical beam based on Inter-Beam Interference (IBI) of the second vertical beam, and determine a second optimal vertical tilting angle of the second vertical beam based on the IBI of the first vertical beam,
    wherein the KIA algorithm is an algorithm using K-means clustering in which the IBI is included as a variable of an objective function, and is configured to cluster user equipments into a first cluster including at least one user equipment and a second cluster including at least one user equipment in a single cell.

2. The communication device of claim 1, wherein the processor is further configured to perform a first operation of initializing a vertical tilting angle of each of the first vertical beam and the second vertical beam to obtain first and second initialized vertical tilting angles, and to perform a second operation of calculating the first and second vertical tilting angles according to whether a number of user equipments included in the first cluster has a value greater than a number of user equipments included in the second cluster.

3. The communication device of claim 2, wherein the processor is further configured to calculate at least one boundary angle separating the first cluster and the second cluster, and to calculate the first and second vertical tilting angles using the at least one boundary angle.

4. The communication device of claim 2, wherein the processor is further configured to obtain N of the first and second initialized vertical tilting angles by iteration of the first operation N times, where N is a positive integer calculate M-th first and second vertical tilting angles by iterating the second operation M times, respectively, based on each of the N first and second initialized vertical tilting angles, where M is a positive integer and determine the first and second optimal vertical tilting angles among the N M-th first and second vertical tilting angles.

5. The communication device of claim 1, wherein the KIA algorithm is applied regardless of a pattern of the double beam determined according to half power beam widths (HPBWs) of the double beam and a vertical side lobe level, wherein the HPBWs of the double beam are the same.

6. The communication device of claim 1, wherein the antenna array is further configured to transmit a signal to at least one of the user equipments included in the first cluster by using the first vertical beam having the first optimal vertical tilting angle, and to transmit the signal to at least one of the user equipments included in the second cluster by using the second vertical beam having the second optimal vertical tilting angle.

7. A method of operating a communication device that performs beamforming, the method comprising:
    forming a first vertical beam and a second vertical beam simultaneously in a single cell for an arbitrary time;
    determining, using a K-means interference avoidance (KIA) algorithm, first and second optimal vertical tilting angles based on a signal-to-interference-plus-noise ratio (SINR) between a double beam including the first vertical beam and the second vertical beam; and
    transmitting a signal using the first vertical beam and the second vertical beam, wherein the SINR of the first vertical beam and the second vertical beam is calculated by considering the second vertical beam and the first vertical beam as an interference signal, respectively,
    wherein the KIA algorithm clusters at least one user equipment related to the first vertical beam and the second vertical beam into a first cluster and a second cluster according to a boundary angle based on an interference signal between the double beam.

8. The method of claim 7, wherein the determining of the first and second optimal vertical tilting angles further comprises determining at least one of the boundary angles for dividing user equipments into the first cluster and the second cluster in the single cell.

9. The method of claim 7, wherein, when the first and second optimal vertical tilting angles are applied to the first vertical beam and the second vertical beam, cell throughput for all user equipments included in the single cell is a maximum value.

10. The method of claim 7, wherein the KIA algorithm is applied regardless of a pattern of the double beam determined according to half power beam widths (HPBWs) of the double beam and a vertical side lobe level, wherein the HPBWs of the double beam are the same.

11. The method of claim 7, wherein the transmitting of the signal using the first vertical beam and the second vertical beam comprises: transmitting the signal to at least one of the user equipments included in the first cluster using the first vertical beam; and transmitting the signal to at least one of the user equipments included in the second cluster using the second vertical beam.

12. A communication system that performs beamforming, the communication system comprising:
a base station configured to determine first and second optimal vertical tilting angles, form a first beam and a second beam to which the first and second optimal vertical tilting angles are applied, respectively, and transmit a signal using the first beam and the second beam at the same time; and
at least one user equipment configured to select a beam having a larger signal-to-interference-plus-noise ratio (SINR) value among the first beam and the second beam, and receive the signal by accessing the selected beam, wherein the first and second optimal vertical tilting angles are obtained by a K-means Interference Avoidance (KIA) algorithm considering interference between the first beam and the second beam.

13. The communication system of claim 12, wherein the KIA algorithm clusters user equipments into a first cluster including at least one of the user equipments connected to the first beam to receive the signal, and a second cluster including at least one of the user equipments connected to the second beam to receive the signal based on a boundary angle.

14. The communication system of claim 13, wherein the first and second optimal vertical tilting angles are determined by at least one of SINR of the first beam and the second beam, cell throughput, a number of user equipments in the first cluster and the second cluster, and the boundary angle.

15. The communication system of claim 12, wherein the user equipment is further configured to select a beam having a larger SINR value among the first beam and the second beam considering a path loss and an antenna gain.

16. The communication system of claim 12, wherein the KIA algorithm is applied regardless of a pattern of a double beam including the first and second beams,
wherein the pattern of the double beam is determined according to half power beam widths (HPBWs) of the double beam and a vertical side lobe level,
wherein the HPBWs of the double beam are the same.

* * * * *